US008503055B2

(12) United States Patent
Serizawa et al.

(10) Patent No.: US 8,503,055 B2
(45) Date of Patent: Aug. 6, 2013

(54) CURVE CORRECTION MECHANISM, OPTICAL SCANNER, AND IMAGE FORMING APPARATUS

(75) Inventors: Keiichi Serizawa, Kanagawa (JP); Hiroshi Johno, Kanagawa (JP); Takeshi Yamakawa, Kanagawa (JP); Kazunori Watanabe, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 139 days.

(21) Appl. No.: 13/154,847

(22) Filed: Jun. 7, 2011

(65) Prior Publication Data

US 2011/0310455 A1 Dec. 22, 2011

(30) Foreign Application Priority Data

Jun. 22, 2010 (JP) ................................ 2010-141365

(51) Int. Cl.
*G02B 26/08* (2006.01)

(52) U.S. Cl.
USPC .................................. 359/207.11; 359/205.1

(58) Field of Classification Search
USPC ................... 359/196.1–226.3, 846, 847, 849; 347/263; 248/466, 468, 476–480
See application file for complete search history.

(56) References Cited

U.S. PATENT DOCUMENTS 6,386,714 B1 * 5/2002 Eggleton et al. .............. 359/846
6,915,677 B1 * 7/2005 Tolomeo ......................... 72/380
7,311,408 B2 * 12/2007 Lee ............................... 359/846
7,443,556 B2 10/2008 Serizawa
7,782,501 B2 8/2010 Serizawa
2004/0179087 A1 * 9/2004 Yoshizawa et al. ........... 347/232
2006/0132880 A1 * 6/2006 Amada et al. ................. 359/196
2009/0009836 A1 * 1/2009 Narita et al. .................. 359/201
2009/0168133 A1 * 7/2009 Narita ...................... 359/207.11

FOREIGN PATENT DOCUMENTS

| | | |
|---|---|---|
| JP | 2001-117040 | 4/2001 |
| JP | 3324302 | 7/2002 |
| JP | 2006-17881 | 1/2006 |
| JP | 2006-65310 | 3/2006 |
| JP | 2008-299304 | 12/2008 |
| JP | 2009-14861 | 1/2009 |
| JP | 2009-145495 | 7/2009 |

* cited by examiner

*Primary Examiner* — Thomas K Pham
*Assistant Examiner* — William M Johnson
(74) *Attorney, Agent, or Firm* — Oblon, Spivak, McClelland, Maier & Neustadt, L.L.P.

(57) ABSTRACT

A curve correction mechanism for correcting a direction and degree of curvature of a reflecting mirror that reflects a light beam includes an adjuster to contact and move a pressing member between a first position, where a first pressing portion of the pressing member presses against an outboard portion of the reflecting mirror provided outboard from a support that supports the reflecting mirror in a longitudinal direction of the reflecting mirror while a second pressing portion of the pressing member is isolated from the reflecting mirror, and a second position, where the second pressing portion of the pressing member presses against an inboard portion of the reflecting mirror provided inboard from the support while the first pressing portion of the pressing member is isolated from the reflecting mirror.

12 Claims, 13 Drawing Sheets

CURVE CORRECTION MECHANISM, OPTICAL SCANNER, AND IMAGE FORMING APPARATUS

CROSS-REFERENCE TO RELATED APPLICATIONS

The present application is based on and claims priority to Japanese Patent Application No. 2010-141365, filed on Jun. 22, 2010, in the Japan Patent Office, which is hereby incorporated herein by reference in its entirety.

BACKGROUND OF THE INVENTION

1. Field of the Invention

Exemplary aspects of the present invention relate to a curve correction mechanism, an optical scanner, and an image forming apparatus, and more particularly, to a curve correction mechanism for correcting a direction and degree of curvature of a reflecting mirror, an optical scanner including the curve correction mechanism, and an image foaming apparatus including the optical scanner.

2. Description of the Related Art

Related-art image forming apparatuses, such as copiers, facsimile machines, printers, or multifunction printers having at least one of copying, printing, scanning, and facsimile functions, typically form an image on a recording medium according to image data. Thus, for example, a charger uniformly charges a surface of an image carrier; an optical writing unit emits a light beam onto the charged surface of the image carrier to form an electrostatic latent image on the image carrier according to the image data; a development device supplies toner to the electrostatic latent image formed on the image carrier to make the electrostatic latent image visible as a toner image; the toner image is directly transferred from the image carrier onto a recording medium or is indirectly transferred from the image carrier onto a recording medium via an intermediate transfer member; a cleaner then cleans the surface of the image carrier after the toner image is transferred from the image carrier onto the recording medium; finally, a fixing device applies heat and pressure to the recording medium bearing the toner image to fix the toner image on the recording medium, thus forming the image on the recording medium.

The optical writing unit, that is, an optical scanner that scans the charged surface of the image carrier with a light beam, used in such image forming apparatuses includes various optical elements (e.g., reflecting mirrors) and supports that support the optical elements. However, such optical elements and supports may suffer from warpage due to machining and assembly errors during manufacturing and thermal deformation due to heat generated by a motor during operation. When the light beam is reflected by a warped reflecting mirror, it may not scan the charged surface of the image carrier straight in a main scanning direction but instead may trace a curve along the surface of the image carrier.

To address this problem, the optical writing unit may employ a curve correction mechanism that corrects the curve of the light beam scanning the image carrier by correcting a direction and degree of curvature of the reflecting mirror. In this case, for example, the reflecting mirror is biased by plate springs attached to a non-mirror face disposed back-to-back to a mirror-face of the reflecting mirror that reflects the light beam at lateral ends of the reflecting mirror in a longitudinal direction thereof, respectively; the plate springs pull the lateral ends of the reflecting mirror inward to curve a center portion of the mirror face of the reflecting mirror into an inwardly concave shape. At the same time, the reflecting mirror is biased by a presser disposed opposite the non-mirror face of the reflecting mirror at a center of the reflecting mirror in the longitudinal direction thereof; the presser presses against the center of the reflecting mirror to curve the center portion of the mirror face of the reflecting mirror into an outwardly convex shape.

However, such configuration has a drawback in that the plate springs pulling the lateral ends of the reflecting mirror and the presser pushing the center of the reflecting mirror together deform the reflecting mirror into an uneven, wave-like form. Accordingly, a light beam reflected by the wave-like form reflecting mirror, when it scans the surface of the image carrier, itself traces a wave-like form optical path thereon, resulting in formation of a faulty electrostatic latent image on the image carrier.

To address this problem, the optical writing unit may employ two pairs of plate springs that slide over the reflecting mirror. For example, each of the two pairs of plate springs sandwiches the reflecting mirror via a holder mounted with two protrusions corresponding to the two pairs of plate springs. As the two pairs of plate springs move outboard from the protrusions, respectively, the center portion of the mirror face of the reflecting mirror in the longitudinal direction thereof is curved into a convex shape. By contrast, as the two pairs of plate springs move inboard from the protrusions toward the center of the reflecting mirror, respectively, the center portion of the mirror face of the reflecting mirror is curved into a concave shape.

However, such configuration also has a drawback in that the two pairs of plate springs sliding over the reflecting mirror, although they slide over a non-illumination section of the reflecting mirror not illuminated by the light beam, may peel off a surface vapor-deposited film of the reflecting mirror. Once the vapor-deposited film is peeled off the reflecting mirror, cracks may propagate in the vapor-deposited film from the peeled-off non-illumination section to an illumination section of the reflecting mirror that reflects the incident light beam, resulting in faulty reflection of the light beam and thus writing of a faulty electrostatic latent image on the image carrier.

BRIEF SUMMARY OF THE INVENTION

This specification describes below an improved curve correction mechanism. In one exemplary embodiment of the present invention, the curve correction mechanism corrects a direction and degree of curvature of a reflecting mirror that reflects a light beam, and includes a support contacting one end of the reflecting mirror in a longitudinal direction thereof to support the reflecting mirror; and a pressing member to press against the reflecting mirror. The pressing member includes a first pressing portion to press against an outboard portion of the reflecting mirror provided outboard from the support in the longitudinal direction of the reflecting mirror; and a second pressing portion to press against an inboard portion of the reflecting mirror provided inboard from the support in the longitudinal direction of the reflecting mirror. The curve correction mechanism further includes an adjuster to contact and move the pressing member between a first position and a second position. In the first position, the first pressing portion of the pressing member presses against the outboard portion of the reflecting mirror while the second pressing portion of the pressing member is isolated from the reflecting mirror. In the second position, the second pressing portion of the pressing member presses against the inboard portion of the reflecting mirror while the first pressing portion of the pressing member is isolated from the reflecting mirror.

This specification further describes an improved optical scanner. In one exemplary embodiment, the optical scanner includes a light beam emitter to emit a light beam; a deflector to deflect the light beam emitted by the light beam emitter in a main scanning direction; a reflecting mirror to reflect the light beam deflected by the deflector; a light beam receptor scanned by the light beam reflected by the reflecting mirror in the main scanning direction; and the curve correction mechanism described above. The curve correction mechanism is attached to the reflecting mirror to correct a direction and degree of curvature of the reflecting mirror.

This specification further describes an improved image forming apparatus. In one exemplary embodiment, the image forming apparatus includes the optical scanner described above.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein.

DETAILED DESCRIPTION OF THE INVENTION

Figure 1:
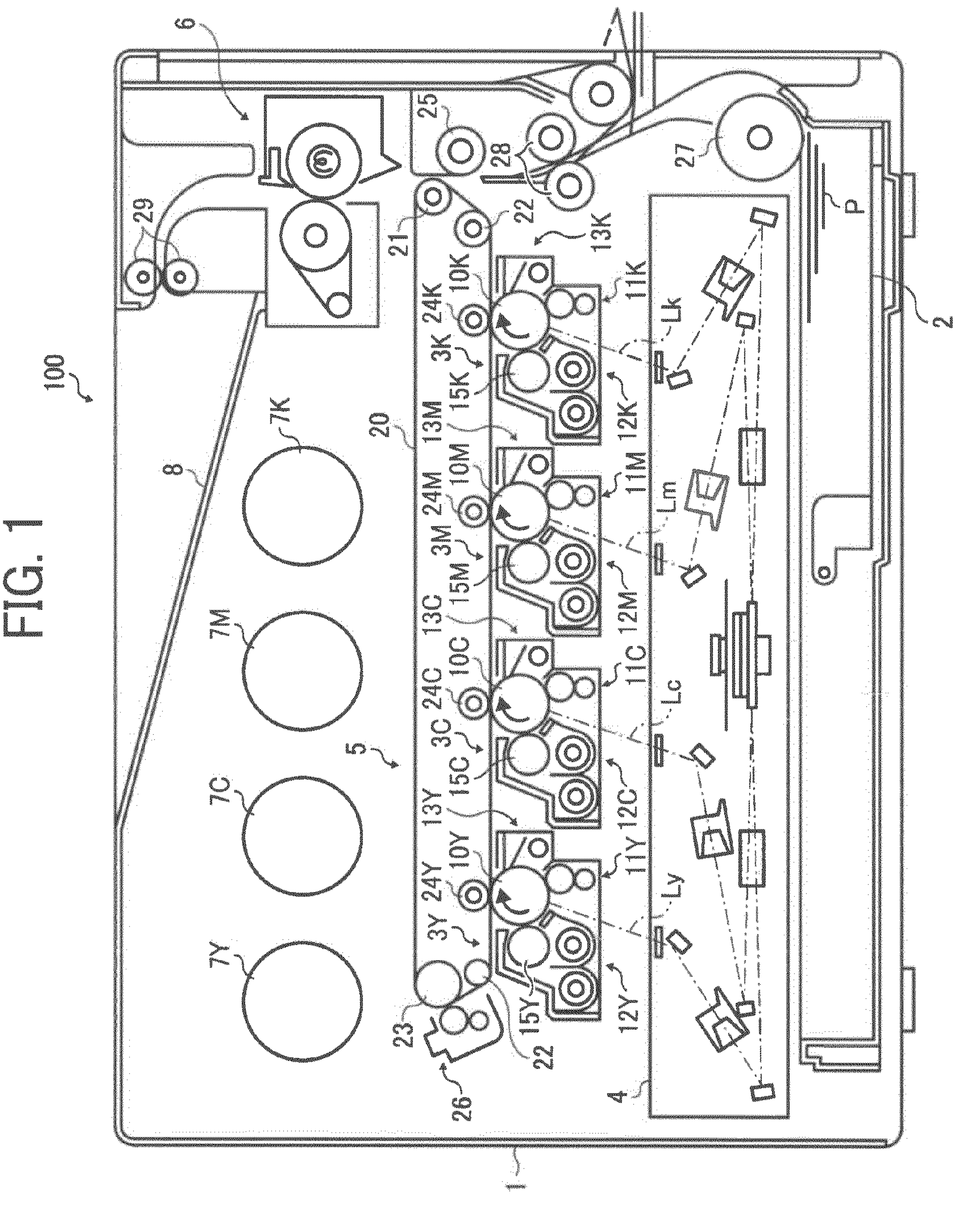
FIG. 1 is a schematic view of an image forming apparatus according to an exemplary embodiment of the present invention.

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Figure 2:
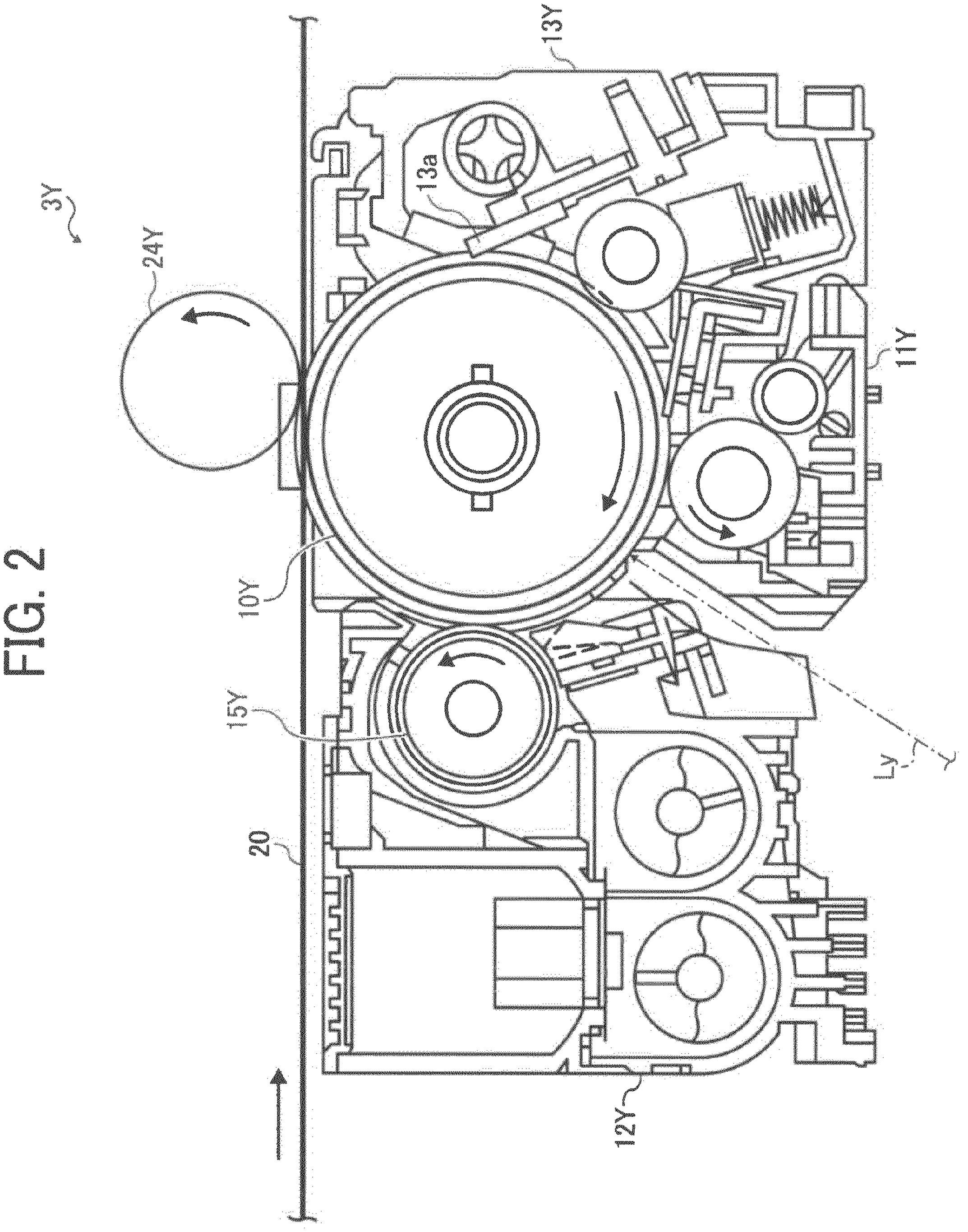
FIG. 2 is a vertical sectional view of an image forming station included in the image forming apparatus shown in FIG. 1.

Referring now to the drawings, wherein like reference numerals designate identical or corresponding parts throughout the several views, in particular to FIGS. 1 and 2, an image forming apparatus 100 according to an exemplary embodiment of the present invention is explained.

FIG. 1 is a schematic view of the image forming apparatus 100. As illustrated in FIG. 1, the image forming apparatus 100 may be a copier, a facsimile machine, a printer, a multifunction printer having at least one of copying, printing, scanning, plotter, and facsimile functions, or the like. According to this exemplary embodiment of the present invention, the image forming apparatus 100 is a color printer for forming a color image on a recording medium by electrophotography.

As illustrated in FIG. 1, the image forming apparatus 100 includes a body 1; a drawer type paper tray 2 disposed in a lower portion of the body 1 and containing a plurality of recording media P (e.g., recording sheets); and image forming stations 3Y, 3C, 3M, and 3K disposed in a center portion of the body 1 and forming yellow, cyan, magenta, and black toner images, respectively. Hereinafter, Y, C, M, and K assigned to the reference numerals define the elements used for forming the yellow, cyan, magenta, and black toner images, respectively.

The image forming stations 3Y, 3C, 3M, and 3K include drum-shaped photoconductors 10Y, 10C, 10M, and 10K each of which serves as a latent image carrier that rotates clockwise in FIG. 1. For example, each of the photoconductors 10Y, 10C, 10M, and 10K includes a cylindrical aluminum base having a diameter of about 40 mm; and a photoconductive layer, for example, an organic photo conductor (OPC), that covers the base.

The photoconductors 10Y, 10C, 10M, and 10K are surrounded by chargers 11Y, 11C, 11M, and 11K that charge the photoconductors 10Y, 10C, 10M, and 10K, development devices 12Y, 12C, 12M, and 12K that render latent images formed on the photoconductors 10Y, 10C, 10M, and 10K visible as yellow, cyan, magenta, and black toner images, and cleaners 13Y, 13C, 13M, and 13K that remove residual toner remaining on the photoconductors 10Y, 10C, 10M, and 10K after the yellow, cyan, magenta, and black toner images are transferred therefrom.

Below the image forming stations 3Y, 3C, 3M, and 3K is an optical writing unit 4, that is, an optical scanner that optically scans the photoconductors 10Y, 10C, 10M, and 10K with light beams Ly, Lc, Lm, and Lk, respectively. Above the image foaming stations 3Y, 3C, 3M, and 3K is an intermediate transfer unit 5 provided with an intermediate transfer belt 20 onto which the yellow, cyan, magenta, and black toner images formed on the photoconductors 10Y, 10C, 10M, and 10K are transferred. Above the intermediate transfer unit 5 is a fixing unit 6 that fixes a color toner image formed on a recording medium P after the yellow, cyan, magenta, and black toner images are transferred from the inter mediate transfer belt 20 to the recording medium P. Beside the fixing unit 6 in an upper portion of the body 1 are toner bottles 7Y, 7C, 7M, and 7K that contain yellow, cyan, magenta, and black toners to be supplied to the development devices 12Y, 12C, 12M, and 12K of the image forming stations 3Y, 3C, 3M, and 3K, respectively. The toner bottles 7Y, 7C, 7M, and 7K are removably installed in the body 1 so that a user can remove them from the body 1 for replacement by opening an output tray 8 disposed atop the body 1.

The optical writing unit 4 includes a plurality of laser diodes serving as a light source; and a polygon mirror having an equilateral polygonal cylinder shape. For example, each of the laser diodes emits a light beam onto the rotating polygon mirror, which in turn is reflected by a mirror face of the rotating polygon mirror as it is deflected in a main scanning direction. Thereafter, the light beam is reflected by a plurality of reflecting mirrors, and then scans over an outer circumferential surface of the respective photoconductors 10Y, 10C, 10M, and 10K uniformly charged by the chargers 11Y, 11C, 11M, and 11K, thus forming electrostatic latent images corresponding to yellow, cyan, magenta, and black colors on the outer circumferential surface of the respective photoconductors 10Y, 10C, 10M, and 10K serving as a latent image carrier. A detailed description of the optical writing unit 4 is deferred.

The intermediate transfer belt 20 of the intermediate transfer unit 5 is looped over a driving roller 21, two tension rollers 22, and a driven roller 23, thus driven and rotated counterclockwise in FIG. 1 at a predetermined time. The intermediate transfer unit 5 further includes four primary transfer rollers 24Y, 24C, 24M, and 24K that primarily transfer and superimpose the yellow, cyan, magenta, and black toner images formed on the photoconductors 10Y, 10C, 10M, and 10K by visualizing the electrostatic latent images with the development devices 12Y, 12C, 12M, and 12K onto the intermediate transfer belt 20 to form a color toner image thereon; a secondary transfer roller 25 that transfers the color toner image formed on the intermediate transfer belt 20 onto a recording medium P sent from the paper tray 2; and a belt cleaner 26 that removes residual toner not transferred onto the recording medium P and therefore remaining on the intermediate transfer belt 20 therefrom.

Referring to FIGS. 1 and 2, the following describes image forming processes for forming a color toner image in the image forming apparatus 100 having the above-described structure.

FIG. 2 is a vertical sectional view of the image forming station 3Y. The other image forming stations 3C, 3M, and 3K depicted in FIG. 1 have the structure identical to that of the image forming station 3Y shown in FIG. 2.

In a charging process, in the image forming stations 3Y, 3C, 3M, and 3K, the chargers 11Y, 11C, 11M, and 11K uniformly charge the photoconductors 10Y, 10C, 10M, and 10K. Then, in an exposure process, the optical writing unit 4 emits light beams Ly, Lc, Lm, and Lk onto the charged photoconductors 10Y, 10C, 10M, and 10K according to image data sent from a client computer, for example, which scan and expose the outer circumferential surface of the respective photoconductors 10Y, 10C, 10M, and 10K, forming an electrostatic latent image thereon. Thereafter, in a development process, development rollers 15Y, 15C, 15M, and 15K of the development devices 12Y, 12C, 12M, and 12K render the electrostatic latent images formed on the photoconductors 10Y, 10C, 10M, and 10K visible as yellow, cyan, magenta, and black toner images with yellow, cyan, magenta, and black toners supplied from the toner bottles 7Y, 7C, 7M, and 7K, respectively.

In a primary transfer process, the primary transfer rollers 24Y, 24C, 24M, and 24K of the intermediate transfer unit 5 primarily transfer and superimpose the yellow, cyan, magenta, and black toner images formed on the photoconductors 10Y, 10C, 10M, and 10K onto the intermediate transfer belt 20 successively, as the intermediate transfer belt 20 rotates counterclockwise in FIG. 1. Specifically, the primary transfer rollers 24Y, 24C, 24M, and 24K transfer the yellow, cyan, magenta, and black toner images in this order from upstream to downstream of the rotating intermediate transfer belt 20 at different times so that the yellow, cyan, magenta, and black toner images are superimposed on the same position on the intermediate transfer belt 20.

After the primary transfer process, a cleaning blade 13*a* of the respective cleaners 13Y, 13C, 13M, and 13K cleans the outer circumferential surface of the respective photoconductors 10Y, 10C, 10M, and 10K, thus the photoconductors 10Y, 10C, 10M, and 10K are ready for the next series of image forming processes.

It is to be noted that the yellow, cyan, magenta, and black toners contained in the toner bottles 7Y, 7C, 7M, and 7K are supplied as needed to the development devices 12Y, 12C, 12M, and 12K of the image forming stations 3Y, 3C, 3M, and 3K through conveyance paths, respectively.

Near the paper tray 2 is a feed roller 27 that picks up and feeds an uppermost recording medium P of the plurality of recording media P loaded in the paper tray 2 to a registration roller pair 28; the registration roller pair 28 further feeds the recording medium P to the secondary transfer roller 25 at a predetermined time when the color toner image formed on the intermediate transfer belt 20 is transferred onto the recording medium P in a secondary transfer process. Thereafter, as the recording medium P bearing the color toner image passes through the fixing unit 6, the fixing unit 6 fixes the color toner image on the recording medium P in a fixing process. Then, an output roller pair 29 disposed downstream from the fixing unit 6 in a recording medium conveyance direction outputs the recording medium P bearing the fixed color toner image onto the output tray 8, thus completing a series of image forming processes performed by the image forming apparatus 100.

Like on the photoconductors 10Y, 10C, 10M, and 10K, residual toner not transferred onto the recording medium P and therefore remaining on the intermediate transfer belt 20 is removed by the belt cleaner 26 that contacts the intermediate transfer belt 20.

Figure 3:
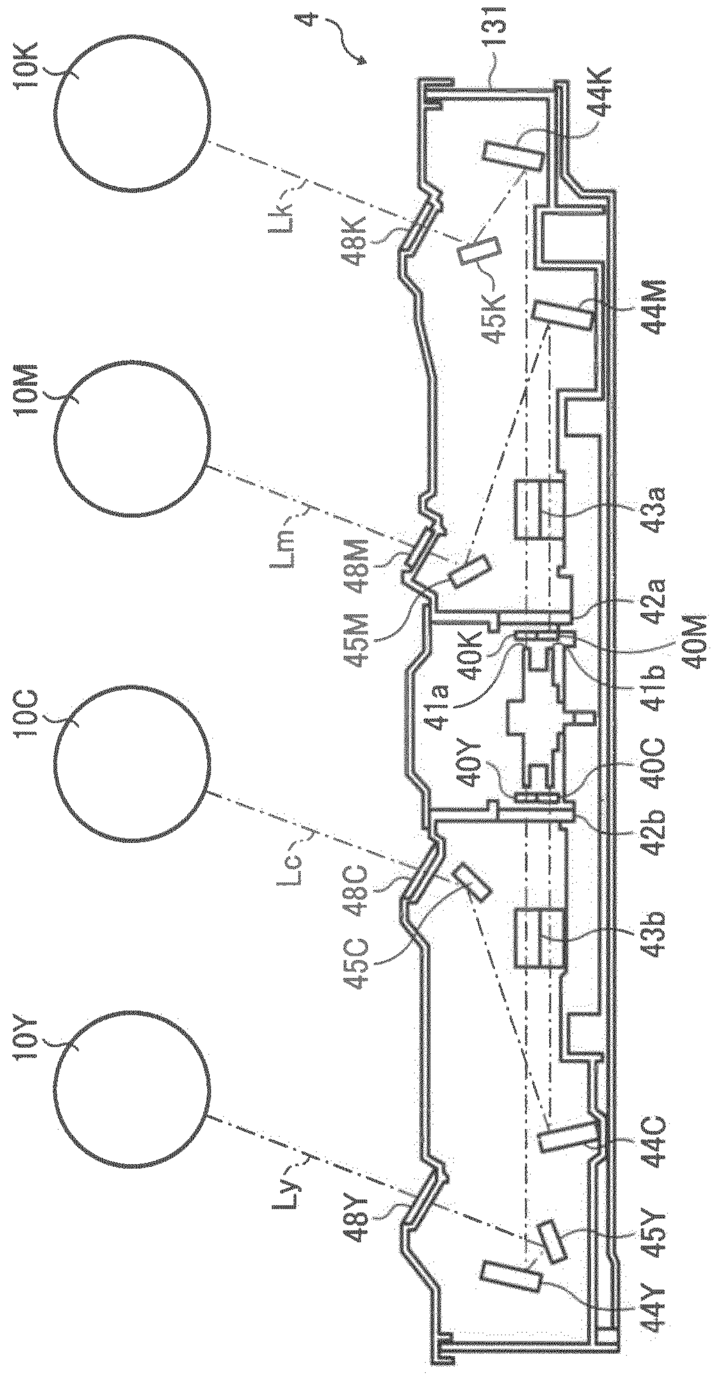
FIG. 3 is a vertical sectional view of an optical writing unit and photoconductors included in the image forming apparatus shown in FIG. 1.

Referring to FIG. 3, the following describes the optical writing unit 4 installed in the image forming apparatus 100 described above.

FIG. 3 is a vertical sectional view of the optical writing unit 4 and the photoconductors 10Y, 10C, 10M, and 10K. As illustrated in FIG. 3, the optical writing unit 4 includes two cylindrical, equilateral polygon mirrors 41*a* and 41*b*, each of which includes six side faces mounted with a reflecting mirror. The polygon mirror 41*a* is vertically combined with the polygon mirror 41*b* in such a manner that an axis of the polygon mirror 41*a* is aligned with an axis of the polygon mirror 41*b*, thus the polygon mirrors 41*a* and 41*b* are rotated about an identical rotation axis at a high speed by a polygon motor. As the polygon mirrors 41*a* and 41*b* rotate, each of them deflects an incident light beam emitted by laser diodes 40Y, 40C, 40M, and 40K serving as a light beam emitter at the six side faces thereof. For example, the upper polygon mirror 41*a* serves as a deflector that deflects light beams Ly and Lk that travel to the polygon mirror 41*a* in directions opposite each other in the main scanning direction so that the light beams Ly and Lk finally reach the photoconductors 10Y and 10K, respectively. By contrast, the lower polygon mirror 41*b* serves as a deflector that deflects light beams Lc and Lm that travel to the polygon mirror 41*b* in directions opposite each other in the main scanning direction so that the light beams Lc and Lm finally reach the photoconductors 10C and 10M, respectively.

In addition to the polygon mirrors 41*a* and 41*b* and the polygon motor described above, the optical writing unit 4 includes four optical reflectors, soundproof glasses 42*a* and 42*b*, scan lenses 43*a* and 43*b*, and dustproof glasses 48Y, 48C, 48M, and 48K.

The light beams Ly and Lc deflected by the polygon mirrors 41*a* and 41*b*, respectively, in the main scanning direction travel through the soundproof glass 42*b* and then through the scan lens 43*b* in a state in which the light beam Ly is above and parallel with the light beam Lc. The scan lens 43*b* gathers the light beams Ly and Lc both in the main scanning direction and a sub scanning direction to convert an equiangular movement of the light beams Ly and Lc in the main scanning direction initiated by the polygon mirrors 41*a* and 41*b* into a constant velocity movement. Simultaneously, the scan lens 43*b* corrects optical face tangle error caused by the polygon mirrors 41*a* and 41*b*.

Conversely, the light beams Lk and Lm deflected by the polygon mirrors 41*a* and 41*b*, respectively, travel through the soundproof glass 42*a* and then through the scan lens 43*a* disposed opposite the scan lens 43*b* via the polygon mirrors 41*a* and 41*b*.

Each of the four optical reflectors includes the laser diode described above and reflecting mirrors that function as mirror but not as lens. For example, the optical reflector for yellow includes the laser diode 40Y, a first reflecting mirror 44Y, and a second reflecting mirror 45Y. Similarly, the optical reflector for cyan includes the laser diode 40C, a first reflecting mirror 44C, and a second reflecting mirror 45C; the optical reflector for magenta includes the laser diode 40M, a first reflecting mirror 44M, and a second reflecting mirror 45M; the optical reflector for black includes the laser diode 40K, a first reflecting mirror 44K, and a second reflecting mirror 45K.

The light beams Ly, Lc, Lm, and Lk that have passed through the scan lenses 43*a* and 43*b* travel toward the above-described first and second reflecting mirrors of the optical reflectors for yellow, cyan, magenta, and black. For example, the light beam Ly that has passed through the scan lens 43*b* is deflected twice by the first reflecting mirror 44Y and the second reflecting mirror 45Y toward the outer circumferential surface of the photoconductor 10Y. Similarly, the light beam Lc that has passed through the scan lens 43*b* is deflected twice by the first reflecting mirror 44C and the second reflecting mirror 45C toward the outer circumferential surface of the photoconductor 10C; the light beam Lm that has passed through the scan lens 43*a* is deflected twice by the first reflecting mirror 44M and the second reflecting mirror 45M toward the outer circumferential surface of the photoconductor 10M; the light beam Lk that has passed through the scan lens 43*a* is deflected twice by the first reflecting mirror 44K and the second reflecting mirror 45K toward the outer circumferential surface of the photoconductor 10K. Thus, the photoconductors 10Y, 10C, 10M, and 10K serve as a light beam receptor that receives the light beams Ly, Lc, Lm, and Lk deflected by the first reflecting mirrors 44Y, 44C, 44M, and 44K and the second reflecting mirrors 45Y, 45C, 45M, and 45K, respectively. It is to be noted that, before reaching the photoconductors 10Y, 10C, 10M, and 10K, the light beams Ly, Lc, Lm, and Lk reflected by the second reflecting mirrors 45Y, 45C, 45M, and 45K pass through the dustproof glasses 48Y, 48C, 48M, and 48K disposed in a top face of the optical writing unit 4, respectively.

Each of the above-described optical reflectors for yellow, cyan, magenta, and black further includes a curve correction mechanism that adjusts a direction and degree of curvature of the laser beam in the main scanning direction by adjusting a direction and degree of curvature of one of the first reflecting mirror and the second reflecting mirror; and a tilt correction mechanism that adjusts tilt of the one of the first reflecting mirror and the second reflecting mirror.

Referring to FIGS. 4 to 9, the following describes the curve correction mechanism and the tilt correction mechanism of the optical reflector for yellow, for example.

Figure 4:
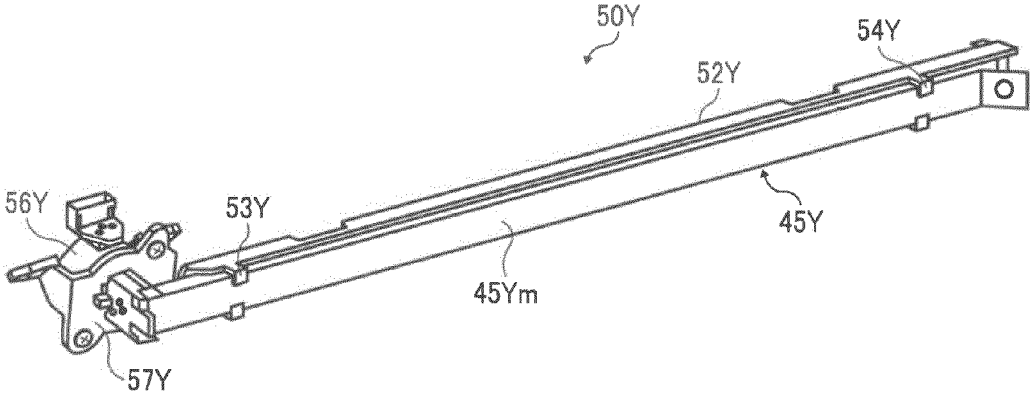
FIG. 4 is a perspective view of a curve correction mechanism included in the optical writing unit shown in FIG. 3.
Figure 5:
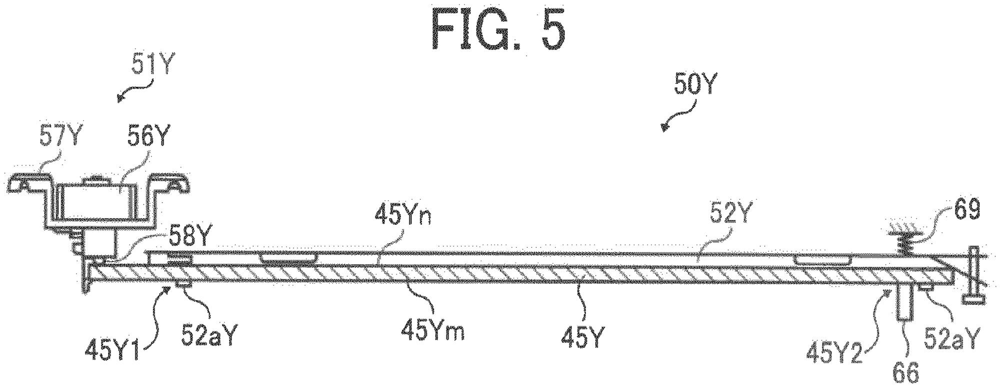
FIG. 5 is a horizontal sectional view of the curve correction mechanism shown in FIG. 4, a second reflecting mirror, and a tilt correction mechanism included in the optical writing unit shown in FIG. 3.

FIG. 4 is a perspective view of the second reflecting mirror 45Y and a curve correction mechanism 50Y of the optical reflector for yellow seen from a mirror face 45Ym of the second reflecting mirror 45Y that reflects the light beam Ly depicted in FIG. 3. FIG. 5 is a horizontal sectional view of the second reflecting mirror 45Y, the curve correction mechanism 50Y, and a tilt correction mechanism 51Y. As illustrated in FIGS. 4 and 5, the curve correction mechanism 50Y includes a holder 52Y, U-shaped in cross-section, attached to a back face 45Yn, that is, a non-mirror face, of the second reflecting mirror 45Y disposed back-to-back to the mirror face 45Ym to hold the second reflecting mirror 45Y.

For example, the holder 52Y, which holds the forcibly curved second reflecting mirror 45Y, has a rigidity greater than that of the second reflecting mirror 45Y, thus the holder 52Y with the greater rigidity minimizes deformation of the holder 52Y over time compared to the configuration in which the holder 52Y has a rigidity equivalent to or smaller than that of the second reflecting mirror 45Y. Accordingly, the holder 52Y can correct the direction and degree of curvature of the second reflecting mirror 45Y in the main scanning direction over an extended period of time.

Figure 6:
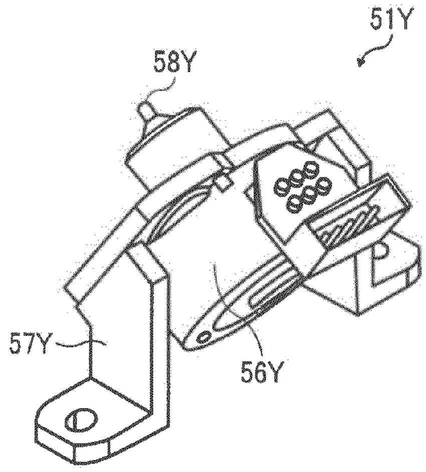
FIG. 6 is a perspective view of the tilt correction mechanism shown in FIG. 5.

As illustrated in FIG. 5, the tilt correction mechanism 51Y contacts the back face 45Yn of the second reflecting mirror 45Y at one lateral end of the second reflecting mirror 45Y in a longitudinal direction thereof. FIG. 6 is a perspective view of the tilt correction mechanism 51Y that includes a tilt adjusting pulse motor 56Y, a motor holder 57Y, and a tilt adjuster 58Y.

Figure 7:
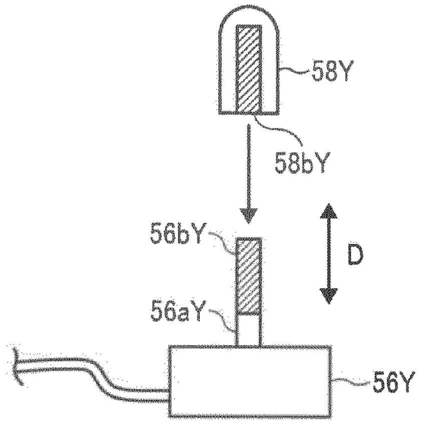
FIG. 7 is a vertical sectional view of a tilt adjusting pulse motor and a tilt adjuster included in the tilt correction mechanism shown in FIG. 6.
Figure 8:
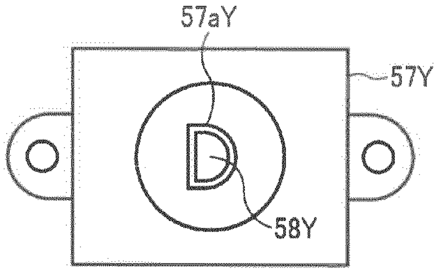
FIG. 8 is a plan view of the tilt adjuster shown in FIG. 7 and a motor holder included in the tilt correction mechanism shown in FIG. 6.

FIG. 7 is a vertical sectional view of the tilt adjusting pulse motor 56Y and the tilt adjuster 58Y. FIG. 8 is a plan view of the motor holder 57Y and the tilt adjuster 58Y. As illustrated in FIG. 7, the tilt adjusting pulse motor 56Y includes a shaft **56*a*Y mounted with a male thread 56*b*Y; the tilt adjuster 58Y includes a female thread 58*b*Y. As the female thread 58*b*Y of the tilt adjuster 58Y engages the male thread 56*b*Y of the tilt adjusting pulse motor 56Y, the tilt adjuster 58Y is attached to the shaft 56*a*Y of the tilt adjusting pulse motor 56Y. As illustrated in FIG. 8, the tilt adjuster 58Y D-shaped in cross-section is inserted into a D-shaped adjuster slot 57*a*Y provided in the motor holder 57Y. Thus, even when the shaft 56*a*Y of the tilt adjusting pulse motor 56Y rotates, the tilt adjuster 58Y engaging the adjuster slot 57*a*Y of the motor holder 57Y does not rotate. Accordingly, in accordance with turning of the rotary shaft 56*a*Y, the tilt adjuster 58Y ascends and descends in a direction D shown in FIG. 7**.

The motor holder 57Y holding the tilt adjusting pulse motor 56Y is mounted on a housing 131 of the optical writing unit 4 depicted in FIG. 3. The tilt adjuster 58Y engaging the male thread **56*b*Y mounted on the shaft 56*a*Y of the tilt adjusting pulse motor 56Y has a head that contacts the back face 45Yn of the second reflecting mirror 45Y at one end of the second reflecting mirror 45Y in the longitudinal direction thereof (hereinafter referred to as a working end 45Y1) as shown in FIG. 5**.

By contrast, another end of the second reflecting mirror 45Y in the longitudinal direction thereof (hereinafter referred to as a fulcrum end 45Y2) is disposed on a support 66 mounted on the housing 131 of the optical writing unit 4. Simultaneously, the fulcrum end 45Y2 of the second reflecting mirror 45Y is biased by a plate spring 69 mounted on the housing 131 of the optical writing unit 4 via the holder 52Y attached to the back face 45Yn of the second reflecting mirror 45Y. Thus, the second reflecting mirror 45Y is sandwiched between the support 66 and the plate spring 69.

Figure 9:
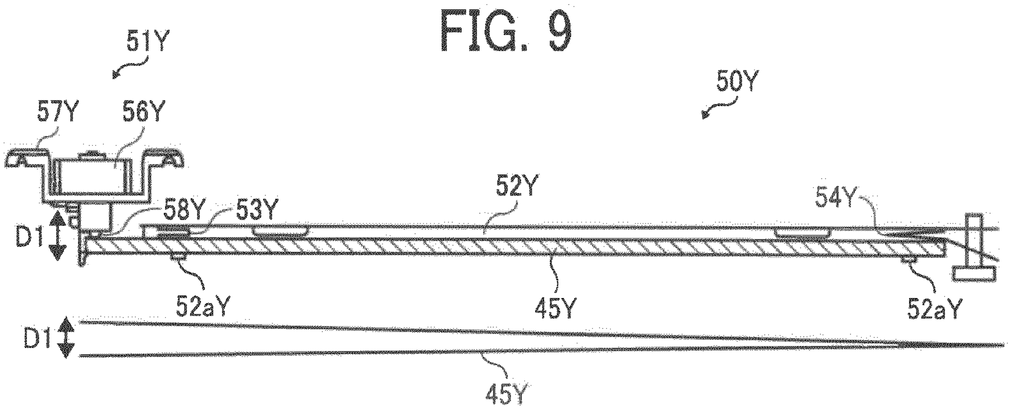
FIG. 9 is a horizontal sectional view of the second reflecting mirror shown in FIG. 5 and the tilt correction mechanism shown in FIG. 6 showing swinging of the second reflecting mirror.

FIG. 9 is a horizontal sectional view of the second reflecting mirror 45Y, the curve correction mechanism 50Y, and the tilt correction mechanism 51Y showing swinging of the second reflecting mirror 45Y. As illustrated in FIG. 7, as the tilt adjuster 58Y engaging the shaft **56*a*Y of the tilt adjusting pulse motor 56Y ascends and descends in accordance with rotation of the shaft 56*a*Y, the pressure of the tilt adjuster 58Y that presses against the working end 45Y1 of the second reflecting mirror 45Y depicted in FIG. 5 changes. Accordingly, the working end 45Y1 of the second reflecting mirror 45Y rotates about the fulcrum end 45Y2 thereof sandwiched between the support 66 and the plate spring 69, that is, swings bidirectionally as indicated by a two-headed arrow D1 in FIG. 9 in which the tilt adjuster 58Y ascends and descends. Thus, the swinging of the second reflecting mirror 45Y changes tilt of the second reflecting mirror 45Y. That is, the tilt of the second reflecting mirror 45Y is adjusted by adjustment of a rotation amount of the tilt adjusting pulse motor 56**Y.

Referring to FIGS. 10A, 10B, 10C, 11, 12A, 12B, and 12C, a detailed description is now given of the curve correction mechanism 50Y installed in the optical writing unit 4 described above.

Figure 10A:
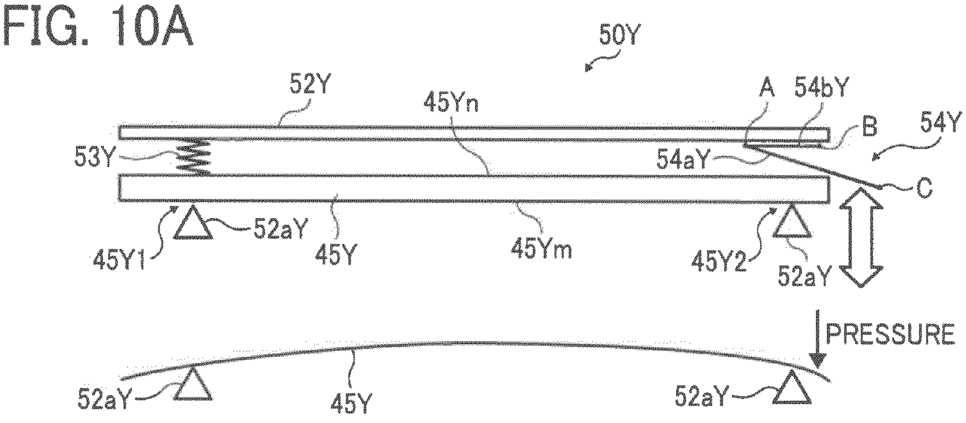
FIG. 10A is a horizontal sectional view of the second reflecting mirror and the curve correction mechanism shown in FIG. 5 showing the second reflecting mirror curved toward a holder of the curve correction mechanism.
Figure 10B:
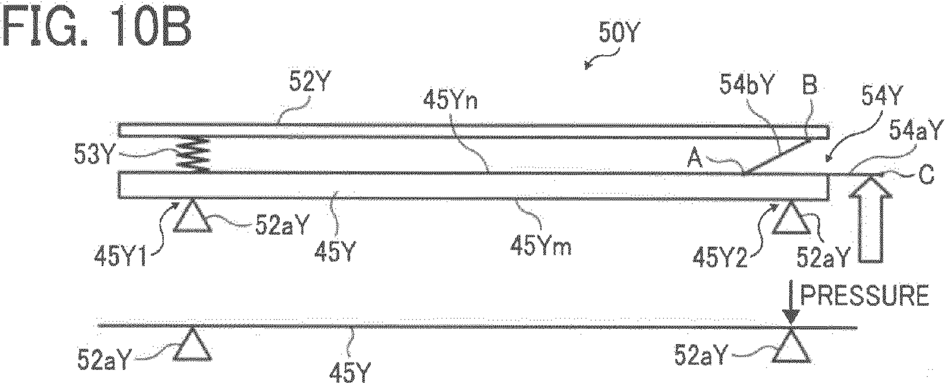
FIG. 10B is a horizontal sectional view of the second reflecting mirror and the curve correction mechanism shown in FIG. 5 showing the flattened second reflecting mirror.
Figure 10C:
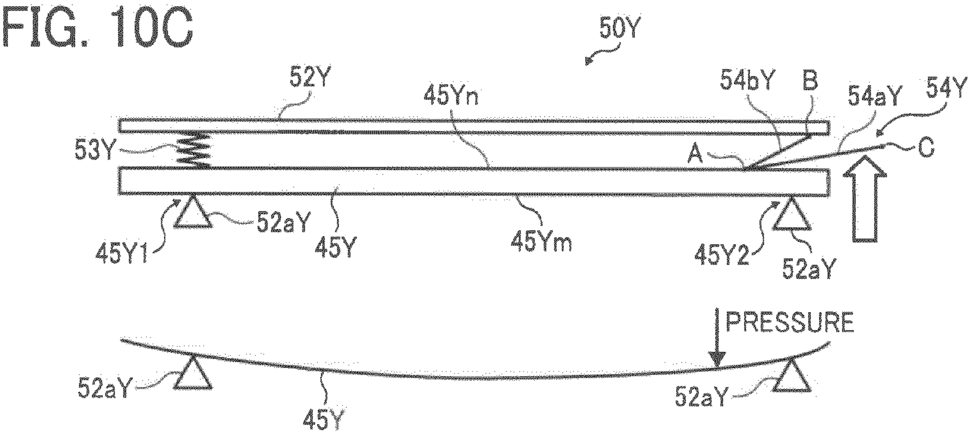
FIG. 10C is a horizontal sectional view of the second reflecting mirror and the curve correction mechanism shown in FIG. 5 showing the second reflecting mirror curved away from a holder of the curve correction mechanism.

FIGS. 10A, 10B, and 10C illustrate a horizontal sectional view of the second reflecting mirror 45Y and the curve correction mechanism 50Y showing curve of the second reflecting mirror 45Y. As illustrated in FIG. 10A, the holder 52Y attached to the back face 45Yn of the second reflecting mirror 45Y to hold it includes two hooks **52*a*Y disposed at lateral ends of the holder 52Y in a longitudinal direction of the holder 52Y and aligned in the longitudinal direction of the second reflecting mirror 45Y. The hooks 52*a*Y, molded with a body of the holder 52Y, engage the mirror face 45Ym of the second reflecting mirror 45Y, thus the holder 52Y holds the second reflecting mirror 45Y at the mirror face 45Ym thereof with the hooks 52*a*Y. That is, the hooks 52*a*Y serve as a support that supports the second reflecting mirror 45Y. As illustrated in FIGS. 4 and 10A, a biasing member 53Y (e.g., a coil spring) is disposed between the holder 52Y and the second reflecting mirror 45Y at the working end 45Y1 of the second reflecting mirror 45Y. The biasing member 53Y presses against the back face 45Yn, that is, the non-mirror face, of the second reflecting mirror 45Y to bias the second reflecting mirror 45Y against the hook 52*a***Y.

Between the holder 52Y and the second reflecting mirror 45Y at the fulcrum end 45Y2 of the second reflecting mirror 45Y is a plate spring 54Y that includes a first face **54*a*Y configured to contact the back face 45Yn of the second reflecting mirror 45Y at the fulcrum end 45Y2 and a second face 54*b*Y at an angle to the first face 54*a*Y and configured to contact the holder 52Y. In an initial state shown in FIG. 10A, the first face 54*a*Y contacts the second reflecting mirror 45Y while the second face 54*b*Y contacts the holder 52Y, thus the first face 54*a*Y makes an acute angle with the second face 54*b*Y. The plate spring 54Y disposed between the holder 52Y and the second reflecting mirror 45Y presses the fulcrum end 45Y2 of the second reflecting mirror 45Y against the hook 52***a*Y contacting the mirror face 45Ym of the second reflecting mirror 45Y, thus forcibly curving the second reflecting mirror 45Y upwardly as shown in the lower diagram in FIG. 10A toward the holder 52Y.

A junction A where the first face 54*a*Y of the plate spring 54Y connects to the second face 54*b*Y of the plate spring 54Y is disposed inboard, that is, leftward in the drawing, from the hook 52*a*Y toward a center of the second reflecting mirror 45Y in the longitudinal direction thereof. A length of the first face 54*a*Y in the longitudinal direction of the second reflecting mirror 45Y is greater than that of the second face 54*b*Y. An edge B of the second face 54*b*Y is disposed inboard, that is, leftward in the drawing, from an edge C of the first face 54*a*Y toward the center of the second reflecting mirror 45Y in the longitudinal direction thereof.

Figure 11:
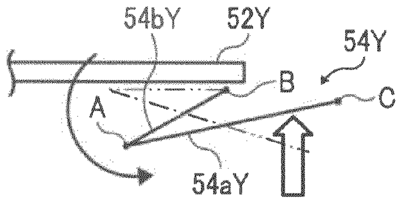
FIG. 11 is a partially enlarged horizontal sectional view of the holder shown in FIG. 10A and a plate spring included in the curve correction mechanism shown in 10A.

FIG. 11 is a partially enlarged horizontal sectional view of the holder 52Y and the plate spring 54Y. With the above-described configuration of the plate spring 54Y, when the first face 54*a*Y of the plate spring 54Y is pressed up toward the holder 52Y in the vicinity of the edge C, the plate spring 54Y is rotated about the edge B of the second face 54*b*Y counterclockwise in FIG. 11. As shown in FIG. 10C, the length of the second face 54*b*Y in the longitudinal direction of the second reflecting mirror 45Y is greater than a gap between the holder 52Y and the second reflecting mirror 45Y, thus, when the plate spring 54Y rotates about the edge B of the second face 54*b*Y counterclockwise, the junction A contacts the back face 45Yn of the second reflecting mirror 45Y.

Figure 12A:
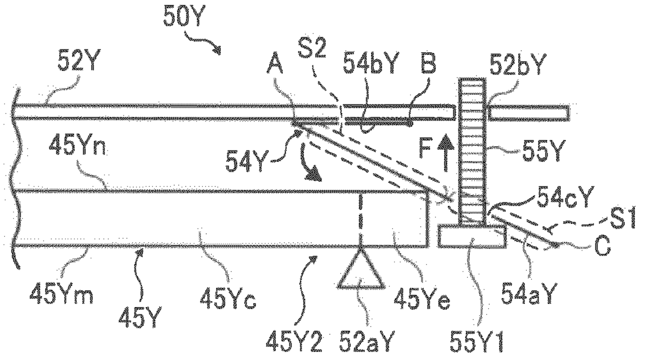
FIG. 12A is a horizontal sectional view of the plate spring shown in FIG. 11 corresponding to the second reflecting mirror shown in FIG. 10A.
Figure 12B:
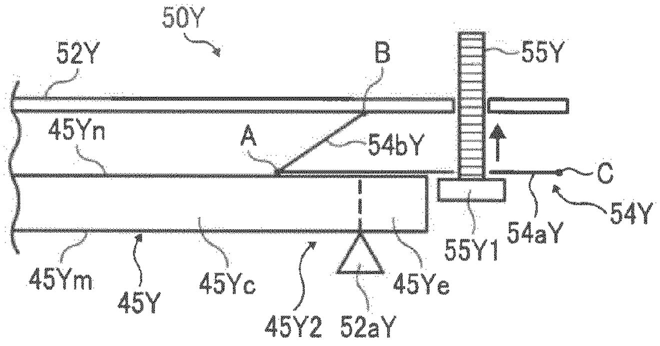
FIG. 12B is a horizontal sectional view of the plate spring shown in FIG. 11 corresponding to the second reflecting mirror shown in FIG. 10B.
Figure 12C:
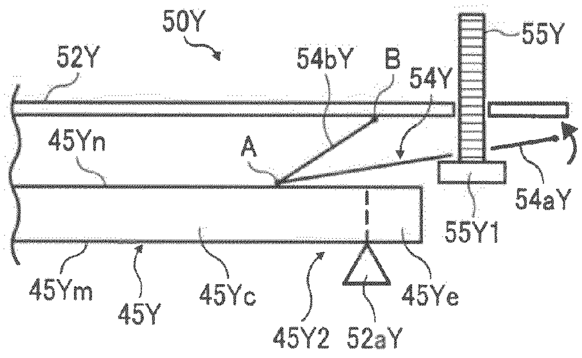
FIG. 12C is a horizontal sectional view of the plate spring shown in FIG. 11 corresponding to the second reflecting mirror shown in FIG. 10C.

Referring to FIGS. 12A, 12B, and 12C, the following describes a mechanism that rotates the plate spring 54Y about the edge B of the second face 54*b*Y.

FIGS. 12A, 12B, and 12C illustrate a horizontal sectional view of the plate spring 54Y and the vicinity thereof. As illustrated in FIG. 12A, near the edge C of the first face 54*a*Y of the plate spring 54Y is a through-hole 54*c*Y through which an adjuster is inserted. In the present embodiment, the adjuster is an adjusting screw 55Y threaded through a threaded through-hole 52*b*Y provided in the holder 52Y.

FIG. 12A illustrates a first position where the first face 54*a*Y of the plate spring 54Y presses against an outboard portion 45Ye of the second reflecting mirror 45Y while the junction A of the plate spring 54Y is isolated from the second reflecting mirror 45Y.

As the adjusting screw 55Y is screwed in a first direction F from the first position shown in FIG. 12A, the adjusting screw 55Y moves toward the holder 52Y, thus a screw head 55Y1 of the adjusting screw 55Y contacts the first face 54*a*Y of the plate spring 54Y as shown in FIG. 12B. Specifically, the adjusting screw 55Y presses against an end section S1 of the first face 54*a*Y of the plate spring 54Y in the longitudinal direction of the second reflecting mirror 45Y to move the plate spring 45Y toward the holder 52Y; one end of the second reflecting mirror 45Y in the longitudinal direction thereof contacts an inboard section S2 of the first face 54*a*Y of the plate spring 54Y provided inboard from the end section S1 thereof toward the junction A.

As the adjusting screw 55Y is screwed further, it moves toward the holder 52Y farther, thus the screw head 55Y1 of the adjusting screw 55Y presses the first face 54*a*Y of the plate spring 54Y toward the holder 52Y. Accordingly, the plate spring 54Y rotates about the edge B of the second face 54*b*Y counterclockwise in FIG. 12A. Simultaneously, as the adjusting screw 55Y presses the first face 54*a*Y of the plate spring 54Y toward the holder 52Y, the first face 54*a*Y applies a decreased pressure to the fulcrum end 45Y2 of the second reflecting mirror 45Y, thus decreasing the curvature of the second reflecting mirror 45Y that curves toward the holder 52Y.

As the adjusting screw 55Y is screwed toward the holder 52Y further, the first face 54*a*Y of the plate spring 54Y contacts the back face 45Yn of the second reflecting mirror 45Y as shown in FIGS. 10B and 12B, thus flattening the second reflecting mirror 45Y as shown in the lower diagram in FIG. 10B. For example, the junction A of the plate spring 54Y contacts the back face 45Yn of the second reflecting mirror 45Y, prohibiting the plate spring 54Y from further rotating counterclockwise in FIG. 10B.

FIG. 12C illustrates a second position where the junction A of the plate spring 54Y presses against the inboard portion 45Yc of the second reflecting mirror 45Y while the first face 54*a*Y of the plate spring 54Y is isolated from the second reflecting mirror 45Y.

As the adjusting screw 55Y is screwed toward the holder 52Y further from the position shown in FIG. 12B to press the first face 54*a*Y toward the holder 52Y, the junction A of the plate spring 54Y contacting the back face 45Yn of the second reflecting mirror 45Y prohibits the plate spring 54Y from rotating counterclockwise. Accordingly, the first face 54*a*Y is pressed toward the second face 54*b*Y and therefore is isolated from the back face 45Yn of the second reflecting mirror 45Y as shown in FIGS. 10C and 12C. Simultaneously, the junction A of the plate spring 54Y applied with a rotation force that rotates the plate spring 54Y counterclockwise in FIG. 12C from the adjusting screw 55Y presses against the back face 45Yn of the second reflecting mirror 45Y. That is, the junction A serves as a second pressing portion that presses against the inboard portion 45Yc of the second reflecting mirror 45Y provided inboard from the hook 52*a*Y to the center of the second reflecting mirror 45Y in the longitudinal direction of the second reflecting mirror 45Y. Since the junction A of the plate spring 54Y contacts the second reflecting mirror 45Y at a position inboard from the hook 52*a*Y, the second reflecting mirror 45Y is curved away from the holder 52Y like a bow by pressure applied from the junction A of the plate spring 54Y as shown in the lower diagram in FIG. 10C. As the adjusting screw 55Y is screwed further toward the holder 52Y, the junction A of the plate spring 54Y applies an increased pressure to the second reflecting mirror 45Y, curving the second reflecting mirror 45Y substantially away from the holder 52Y.

As the adjusting screw 55Y is screwed in a second direction counter to the first direction F described above from the position shown in FIGS. 10C and 12C, the first face 54*a*Y of the plate spring 54Y pressed toward the second face 54*b*Y rotates clockwise in FIG. 12C by its return force to the position shown in FIGS. 10B and 12B. Simultaneously, the adjusting screw 55Y applies a decreased force that rotates the plate spring 54Y; the junction A of the plate spring 54Y applies a decreased pressure to the second reflecting mirror 45Y, thus decreasing the curvature of the second reflecting mirror 45Y that curves away from the holder 52Y.

As the adjusting screw 55Y is screwed further in the second direction counter to the first direction F from the position shown in FIGS. 10B and 12B, with leverage of the second reflecting mirror 45Y having the fulcrum end 45Y2, the return force of the first face 54*a*Y of the plate spring 54Y is applied to the junction A, moving the junction A toward the holder 52Y. Consequently, the plate spring 54Y rotates about the edge B of the second face 54*b*Y clockwise in FIG. 12B to the position shown in FIGS. 10A and 12A. Simultaneously, the first face 54*a*Y of the plate spring 54Y presses against the fulcrum end 45Y2 of the second reflecting mirror 45Y by its return force, curving the second reflecting mirror 45Y toward the holder 52Y as shown in the lower diagram in FIG. 10A. That is, the first face 54*a*Y serves as a first pressing portion that presses against the outboard portion 45Ye of the second reflecting mirror 45Y provided outboard from the hook 52*a*Y to one lateral edge of the second reflecting mirror 45Y in the longitudinal direction of the second reflecting mirror 45Y.

As described above, according to this exemplary embodiment, the plate spring 54Y, serving as a pressing member that presses against the second reflecting mirror 45Y, swings or rotates to switch a pressure application position where the plate spring 54Y presses against the second reflecting mirror 45Y between the outboard portion 45Ye provided outboard from the hook 52*a*Y and the inboard portion 45Yc provided inboard from the hook 52*a*Y in the longitudinal direction of the second reflecting mirror 45Y, thus curving the second reflecting mirror 45Y toward and away from the holder 52Y. Accordingly, the curvature of the second reflecting mirror 45Y can be corrected bidirectionally over the main scanning direction. Further, the pressure application position where the plate spring 54Y presses against the second reflecting mirror 45Y can be switched without sliding the plate spring 54Y over the mirror face 45Ym of the second reflecting mirror 45Y, preventing a surface vapor-deposited film, for example, a vapor-deposited film treated with aluminum-vapor-deposition on a resin plate, from peeling off the mirror face 45Ym of the second reflecting mirror 45Y.

Moreover, the plate spring 54Y presses against the second reflecting mirror 45Y by its return force, reducing manufacturing costs. It is to be noted that, according to this exemplary embodiment, the plate spring 54Y is retained between the holder 52Y and the second reflecting mirror 45Y by its return force; alternatively, the edge B of the second face 54*b*Y may be rotatably attached to the holder 52Y.

Referring to FIGS. 13A, 13B, 14A, and 14B, the following describes variations of the plate spring 54Y described above.

Figure 13A:
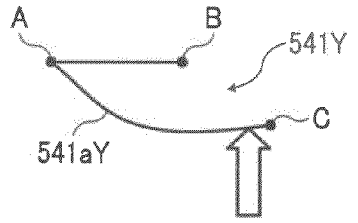
FIG. 13A is a vertical sectional view of a plate spring as a first variation of the plate spring shown in FIG. 11.
Figure 13B:
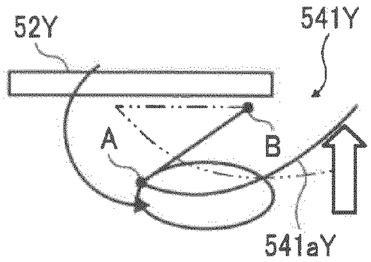
FIG. 13B is a vertical sectional view of the plate spring shown in FIG. 13A in a state in which it is pressed toward the holder shown in FIG. 10A.

Referring to FIGS. 13A and 13B, a detailed description is now given of a first variation of the plate spring 54Y. FIG. 13A is a vertical sectional view of a plate spring 541Y as the first variation of the plate spring 54Y. FIG. 13B is a vertical sectional view of the plate spring 541Y and the holder 52Y.

As illustrated in FIG. 13A, the plate spring 541Y, serving as a pressing member that presses against the second reflecting mirror 45Y depicted in FIG. 12A, includes a first face 541*a*Y, serving as a first pressing portion, that curves toward the second reflecting mirror 45Y. As the screw head 55Y1 of the adjusting screw 55Y depicted in FIG. 12A presses the curved first face 541*a*Y at a portion of the first face 541*a*Y near the edge C toward the holder 52Y to rotate the plate spring 541Y counterclockwise as shown FIG. 13B, the first face 541*a*Y contacts the back face 45Yn (depicted in FIG. 12A) of the second reflecting mirror 45Y at a position different from a position where the first face 541*a*Y contacts the second reflecting mirror 45Y when it is not pressed by the adjusting screw 55Y as shown in FIG. 13A. Specifically, as the plate spring 541Y rotates clockwise from the position shown in FIG. 13B, the position where the first face 541*a*Y contacts the second reflecting mirror 45Y changes from the outboard portion 45Ye depicted in FIG. 12A to the inboard portion 45Yc depicted in FIG. 12C of the second reflecting mirror 45Y continuously. Thus, the pressure application position where the plate spring 541Y presses against the second reflecting mirror 45Y can be changed continuously; the curvature of the second reflecting mirror 45Y can be corrected precisely.

Figure 14A:
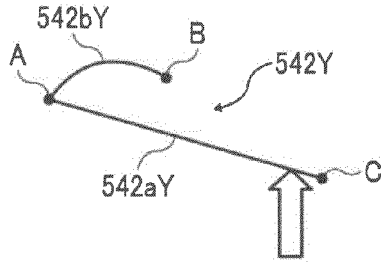
FIG. 14A is a vertical sectional view of a plate spring as a second variation of the plate spring shown in FIG. 11.
Figure 14B:
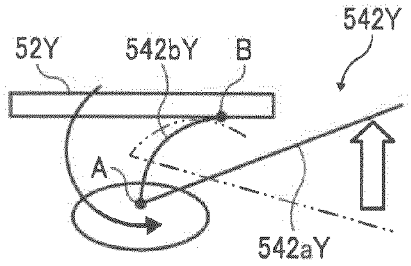
FIG. 14B is a vertical sectional view of the plate spring shown in FIG. 14A in a state in which it is pressed toward the holder shown in FIG. 10A.

Referring to FIGS. 14A and 14B, a detailed description is now given of a second variation of the plate spring 54Y. FIG. 14A is a vertical sectional view of a plate spring 542Y as the second variation of the plate spring 54Y. FIG. 14B is a vertical sectional view of the plate spring 542Y and the holder 52Y.

As illustrated in FIGS. 14A and 14B, the plate spring 542Y, serving as a pressing member that presses against the second reflecting mirror 45Y, includes a second face 542*b*Y that curves toward the holder 52Y. When the junction A of the plate spring 542Y contacts the second reflecting mirror 45Y depicted in FIG. 12C, the second face 542*b*Y of the plate spring 542Y contacts the holder 52Y at a portion thereof inboard from the edge B toward the junction A. As the screw head 55Y1 of the adjusting screw 55Y depicted in FIG. 12C presses a first face 542*a*Y, serving as a first pressing portion, of the plate spring 542Y toward the holder 52Y in a state in which the junction A of the plate spring 542Y contacts the second reflecting mirror 45Y as shown in FIG. 14B, the second face 542*b*Y of the plate spring 542Y is deformed by a reaction force from the holder 52Y. That is, the second face 542*b*Y functions as a plate spring. Accordingly, the junction A is applied with a return force of the second face 542*b*Y, thus applying an increased pressure to the second reflecting mirror 45Y compared to when the second face 542*b*Y is not deformed and therefore is flat. Consequently, the increased pressure applied to the second reflecting mirror 45Y curves a center portion of the second reflecting mirror 45Y in the longitudinal direction thereof with respect to the holder 52Y farther, thus attaining a greater range of adjustment of the curvature of the second reflecting mirror 45Y.

Referring to FIGS. 15A, 15B, 16, 17, 18A, and 18B, the following describes variations of the curve correction mechanism 50Y depicted in FIG. 5.

Figure 15A:
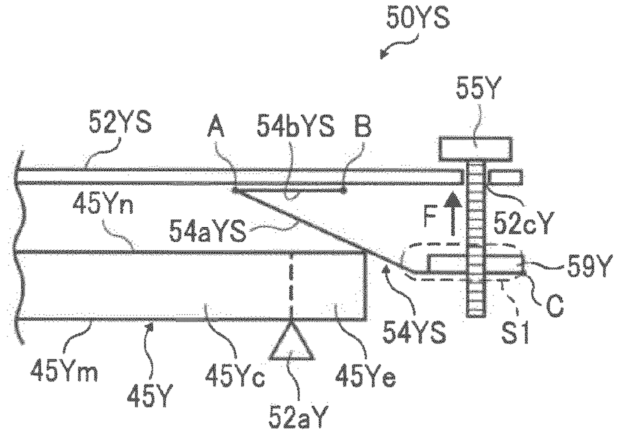
FIG. 15A is a partial horizontal sectional view of a curve correction mechanism as a first variation of the curve correction mechanism shown in FIG. 5 showing a plate spring included therein corresponding to the second reflecting mirror shown in FIG. 10A.
Figure 15B:
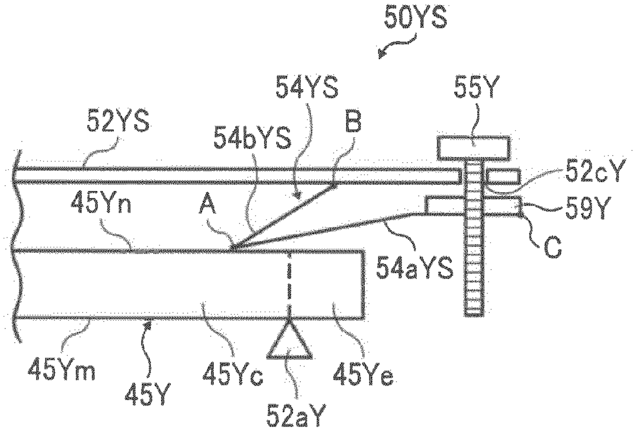
FIG. 15B is a partial horizontal sectional view of the curve correction mechanism shown in FIG. 15A showing the plate spring corresponding to the second reflecting mirror shown in FIG. 10C.
Figure 16:
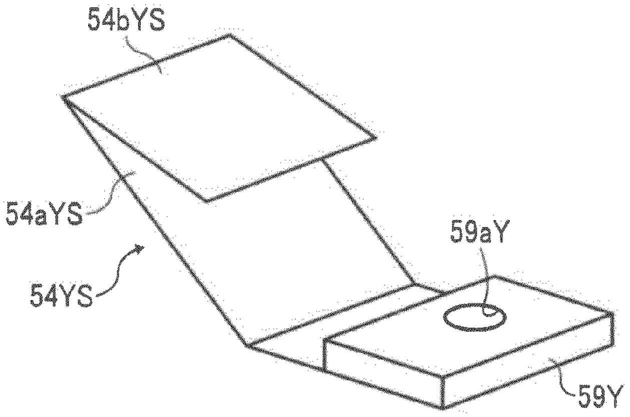
FIG. 16 is a perspective view of the plate spring shown in FIG. 15A and a through-hole base included in the curve correction mechanism shown in FIG. 15A.

Referring to FIGS. 15A, 15B, and 16, a detailed description is now given of a curve correction mechanism 50YS as the first variation of the curve correction mechanism 50Y.

FIGS. 15A and 15B illustrate a partial horizontal sectional view of the curve correction mechanism 50YS. FIG. 16 is a perspective view of a plate spring 54YS and a through-hole base 59Y of the curve correction mechanism 50YS.

As illustrated in FIG. 16, the through-hole base 59Y with a threaded through-hole 59*a*Y is swaged or attached with an adhesive to the edge C depicted in FIG. 15A of a first face 54*a*YS, serving as a first pressing portion, of the plate spring 54YS serving as a pressing member. As illustrated in FIG. 15A, a through-hole 52*c*Y is provided in a holder 52YS. The adjusting screw 55Y is passed through the through-hole 52*c*Y and is threaded into the threaded through-hole 59*a*Y provided in the through-hole base 59Y.

As the adjusting screw 55Y is screwed in the first direction F, the through-hole base 59Y moves toward the holder 52YS, pressing the end section S1 of the first face 54*a*YS of the plate spring 54YS toward the holder 52YS. Accordingly, the plate spring 54YS rotates about the edge B of a second face 54*b*YS counterclockwise in FIG. 15A. Simultaneously, as the through-hole base 59Y presses the first face 54*a*YS toward the holder 52YS, the first face 54*a*YS presses against the second reflecting mirror 45Y with a decreased pressure, decreasing the curvature of the center portion of the second reflecting mirror 45Y in the longitudinal direction thereof that curves toward the holder 52YS. As the adjusting screw 55Y is screwed further to move the through-hole base 59Y toward the holder 52YS, the junction A of the plate spring 54YS contacts the inboard portion 45Yc of the second reflecting mirror 45Y provided inboard from the hook 52*a*Y to the center portion of the second reflecting mirror 45Y in the longitudinal direction thereof.

As the adjusting screw 55Y is screwed further to move the through-hole base 59Y toward the holder 52YS, the first face 54*a*YS is bent as shown in FIG. 15B and therefore is isolated from the second reflecting mirror 45Y, thus the plate spring 54YS presses against the second reflecting mirror 45Y at the junction A. Accordingly, the center portion of the second reflecting mirror 45Y in the longitudinal direction thereof curves away from the holder 52YS. As the adjusting screw 55Y is screwed further to move the through-hole base 59Y toward the holder 52YS, the junction A of the plate spring 54YS presses against the second reflecting mirror 45Y with an increased pressure, thus curving the center portion of the second reflecting mirror 45Y in the longitudinal direction thereof away from the holder 52YS substantially.

With the above-described configuration of the curve correction mechanism 50YS, a service engineer can touch and screw the adjusting screw 55Y from the holder 52YS. Accordingly, even when the service engineer is unable to screw the adjusting screw 55Y from the mirror face 45Ym of the second reflecting mirror 45Y due to limited space near the second reflecting mirror 45Y, for example, the service engineer can screw the adjusting screw 55Y installed in the curve correction mechanism 50YS easily to correct the direction and degree of curvature of the second reflecting mirror 45Y.

Figure 17:
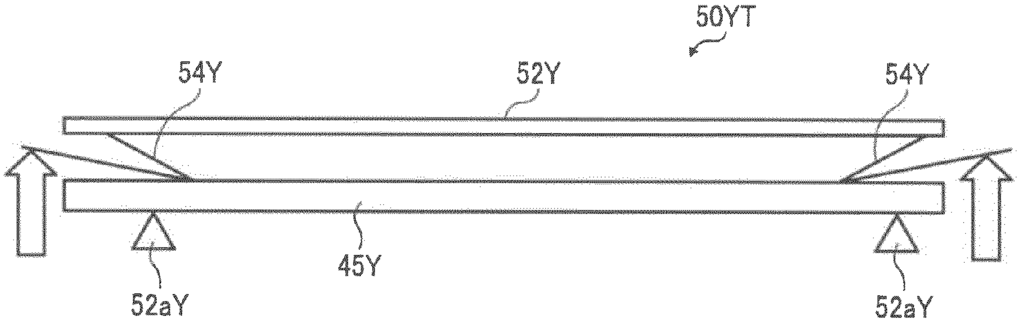
FIG. 17 is a horizontal sectional view of a curve correction mechanism as a second variation of the curve correction mechanism shown in FIG. 5.

Referring to FIG. 17, a detailed description is now given of a curve correction mechanism 50YT as a second variation of the curve correction mechanism 50Y.

FIG. 17 is a horizontal sectional view of the curve correction mechanism 50YT.

As illustrated in FIG. 17, the curve correction mechanism 50YT includes two sets of the plate spring 54Y and the adjusting screw 55Y depicted in FIG. 12C provided at both lateral ends of the second reflecting mirror 45Y in the longitudinal direction thereof, respectively, so that the adjusting screws 55Y change the pressure application position on the second reflecting mirror 45Y where the plate springs 54Y press against the second reflecting mirror 45Y at both lateral ends, respectively. With this configuration, the crest of the curved second reflecting mirror 45Y is at the center of the second reflecting mirror 45Y in the longitudinal direction thereof, minimizing displacement of the electrostatic latent images for yellow, cyan, magenta, and black formed on the respective photoconductors 10Y, 10C, 10M, and 10K by light beams Ly, Lc, Lm, and Lk reflected by the curved second reflecting mirrors 45Y, 45C, 45M, and 45K depicted in FIG. 3 precisely.

Conversely, the configuration in which one set of the plate spring 54Y and the adjusting screw 55Y is provided at one lateral end of the second reflecting mirror 45Y in the longitudinal direction thereof attains an advantage of allowing the service engineer to adjust one adjusting screw 55Y, thus facilitating the service of the service engineer. Additionally, such configuration attains another advantage of reducing the number of parts, resulting in reduced manufacturing costs.

Figure 18A:
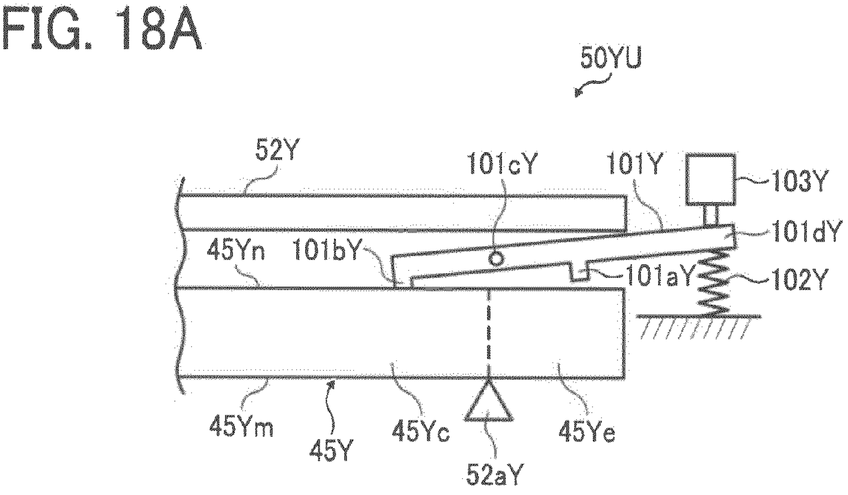
FIG. 18A is a partial horizontal sectional view of a curve correction mechanism as a third variation of the curve correction mechanism shown in FIG. 5 in a state in which an actuator does not press against a pressing lever.
Figure 18B:
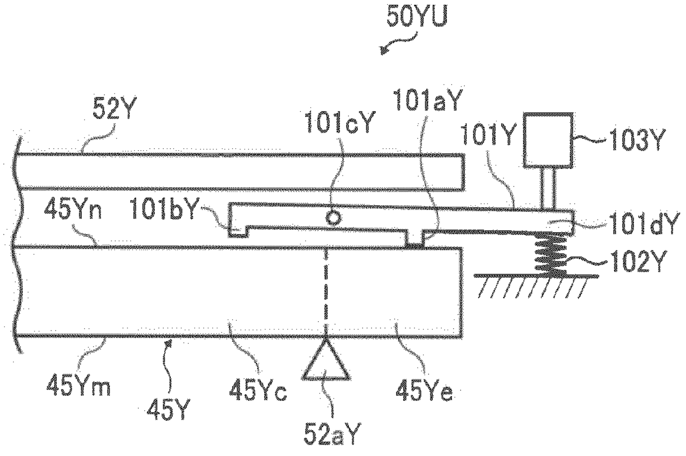
FIG. 18B is a partial horizontal sectional view of the curve correction mechanism shown in FIG. 18A in a state in which the actuator presses against the pressing lever.

Referring to FIGS. 18A and 18B, a detailed description is now given of a curve correction mechanism 50YU as a third variation of the curve correction mechanism 50Y.

FIGS. 18A and 18B illustrate a partial horizontal sectional view of the curve correction mechanism 50YU.

As illustrated in FIG. 18A, the curve correction mechanism 50YU includes a pressing lever 101Y serving as a pressing member that presses against the second reflecting mirror 45Y. The pressing lever 101Y includes a first pressing portion 101*a*Y serving as a first pressing portion that contacts and presses against the outboard portion 45Ye of the second reflecting mirror 45Y provided outboard from the hook 52*a*Y in the longitudinal direction of the second reflecting mirror 45Y; a second pressing portion 101*b*Y serving as a second pressing portion that contacts and presses against the inboard portion 45Yc of the second reflecting mirror 45Y provided inboard from the hook 52*a*Y in the longitudinal direction of the second reflecting mirror 45Y; and a shaft 101*c*Y inserted into a through-hole disposed between the first pressing portion 101*a*Y and the second pressing portion 101*b*Y. The shaft 101*c*Y is mounted on a flange face of the U-shaped holder 52Y that protrudes toward the second reflecting mirror 45Y from a parallel face of the U-shaped holder 52Y disposed parallel to the back face 45Yn of the second reflecting mirror 45Y. Thus, the pressing lever 101Y is attached to the holder 52Y in such a manner that it is rotatable about the shaft 101*c*Y.

As illustrated in FIG. 18A, the pressing lever 101Y has the second pressing portion 101*b*Y at one end of the pressing lever 101Y in the longitudinal direction of the second reflecting mirror 45Y; the pressing lever 101Y is contacted by a biasing member 102Y (e.g., a coil spring) at another end of the pressing lever 101Y (hereinafter referred to as a swing end 101*d*Y). The biasing member 102Y biases the swing end 101*d*Y of the pressing lever 101Y against an actuator 103Y toward the holder 52Y. Thus, the second pressing portion 101*b*Y of the pressing lever 101Y contacts the second reflecting mirror 45Y and presses the second reflecting mirror 45Y away from the holder 52Y by a bias applied by the biasing member 102Y, curving the second reflecting mirror 45Y away from the holder 52Y.

The actuator 103Y, serving as an adjuster contacting the swing end 101*d*Y of the pressing lever 101Y, is disposed opposite the biasing member 102Y via the pressing lever 101Y. Alternatively, the adjuster may be an adjusting screw. For example, the adjusting screw may be threaded into a threaded through-hole provided in the holder 52Y so that a point of the adjusting screw contacts the pressing lever 101Y.

As the actuator 103Y is driven and presses the swing end 101*d*Y of the pressing lever 101Y against the biasing member 102Y, the biasing member 102Y applies a decreased bias to the pressing lever 101Y, decreasing pressure applied from the second pressing portion 101*b*Y of the pressing lever 101Y to the second reflecting mirror 45Y. Consequently, the curvature of the center portion of the second reflecting mirror 45Y in the longitudinal direction thereof that curves away from the holder 52Y is decreased. Further, as the actuator 103Y presses the swing end 101*d*Y of the pressing lever 101Y against the biasing member 102Y, the pressing lever 101Y rotates clockwise in FIG. 18A; the second pressing portion 101*b*Y of the pressing lever 101Y is isolated from the second reflecting mirror 45Y; the first pressing portion 101*a*Y of the pressing lever 101Y contacts the second reflecting mirror 45Y as shown in FIG. 18B. Specifically, the first pressing portion 101*a*Y of the pressing lever 101Y presses against the outboard portion 45Ye of the second reflecting mirror 45Y provided outboard from the hook 52*a*Y, thus the center portion of the second reflecting mirror 45Y in the longitudinal direction thereof curves toward the holder 52Y. As the actuator 103Y presses the pressing lever 101Y against the biasing member 102Y further, the first pressing portion 101*a*Y presses against the second reflecting mirror 45Y with an increased pressure, curving the center portion of the second reflecting mirror 45Y in the longitudinal direction thereof toward the holder 52Y substantially.

With this configuration also, the pressure application position where the pressing lever 101Y presses against the second reflecting mirror 45Y is switched between the second position shown in FIG. 18A where the second pressing portion 101*b*Y of the pressing lever 101Y presses against the inboard portion 45Yc of the second reflecting mirror 45Y and the first position shown in FIG. 18B where the first pressing portion 101*a*Y of the pressing lever 101Y presses against the outboard portion 45Ye of the second reflecting mirror 45Y, without sliding the biasing member 102Y in the longitudinal direction of the second reflecting mirror 45Y.

The following describes advantages of the curve correction mechanism 50Y, 50YS, 50YT, and 50YU according to the above-described exemplary embodiments by comparing them with comparative curve correction mechanisms 50C1 and 50C2 described below.

Referring to FIGS. 19 to 26, a detailed description is now given of the comparative curve correction mechanism 50C1.

Figure 19:
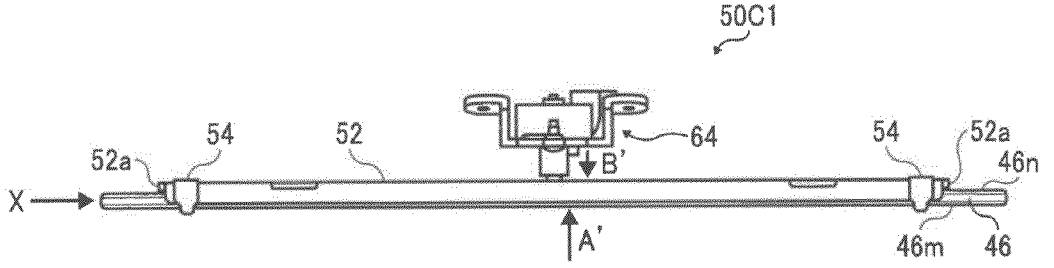
FIG. 19 is a horizontal sectional view of one comparative curve correction mechanism.
Figure 20:
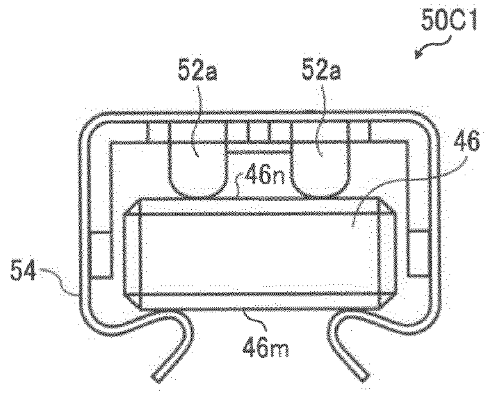
FIG. 20 is a vertical sectional view of the comparative curve correction mechanism shown in FIG. 19.

FIG. 19 is a horizontal sectional view of the comparative curve correction mechanism 50C1. FIG. 20 is a vertical sectional view of the comparative curve correction mechanism 50C1 seen in a direction X in FIG. 19.

As illustrated in FIG. 19, the comparative curve correction mechanism 50C1 includes a reflecting mirror 46 installed in an optical writing unit in which a plurality of reflecting mirrors including the reflecting mirror 46 deflects a light beam to a latent image carrier (e.g., a photoconductor) so that the light beam writes an electrostatic latent image on the latent image carrier. The reflecting mirror 46 is held by a holder 52 disposed opposite a back face 46*n*, that is, a non-mirror face, of the reflecting mirror 46.

The holder 52 includes two protrusions 52*a* disposed at lateral ends thereof in a longitudinal direction of the holder 52, respectively, which protrude toward the reflecting mirror 46 as shown in FIG. 20 and contact the back face 46*n* of the reflecting mirror 46. At the positions inboard from the protrusions 52*a* in the longitudinal direction of the holder 52, respectively, the holder 52 is mounted with plate springs 54 as shown in FIG. 19. As illustrated in FIGS. 19 and 20, the respective plate springs 54 contact and press against a mirror face 46*m* of the reflecting mirror 46. Accordingly, a center portion of the reflecting mirror 46 in a longitudinal direction thereof is bent in a direction A' in FIG. 19, thus curved toward the holder 52, that is, from the mirror face 46*m* to the back face 46*n* of the reflecting mirror 46. Namely, the protrusions 52*a* and the plate springs 54 function as a first curving member that curves the reflecting mirror 46 forcibly. Conversely, a presser 64, contacting a back face of the holder 52 disposed back-to-back to a front face disposed opposite the back face 46*n* of the reflecting mirror 46, presses against the holder 52 in a direction B' counter to the direction A', thus functioning as a second curving member that presses against the center portion of the reflecting mirror 46 in the longitudinal direction thereof via the holder 52.

Figure 21:
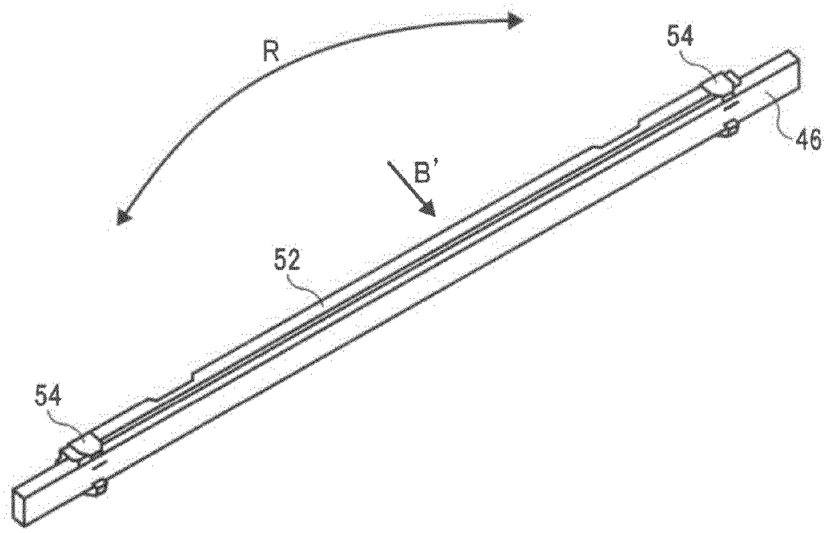
FIG. 21 is a perspective view of a reflecting mirror forcibly curved by a holder included in the comparative curve correction mechanism shown in FIG. 19.
Figure 22:
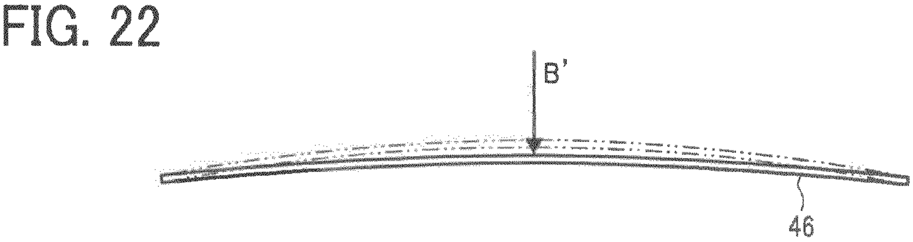
FIG. 22 is a horizontal sectional view of the reflecting mirror shown in FIG. 21 slightly pressed by a presser included in the comparative curve correction mechanism shown in FIG. 19.
Figure 23:
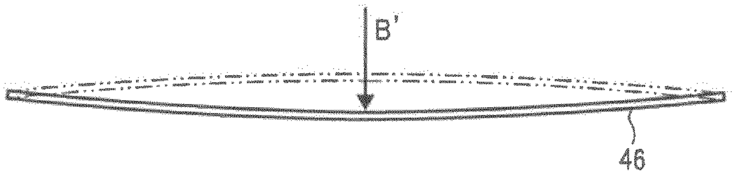
FIG. 23 is a horizontal sectional view of the reflecting mirror shown in FIG. 21 further pressed by the presser shown in FIG. 19.

FIG. 21 is a perspective view of the reflecting mirror 46 forcibly curved by the holder 52. As illustrated in FIG. 21, when the presser 64 depicted in FIG. 19 does not press against the reflecting mirror 46, the reflecting mirror 46 is forcibly curved in a curve R in such a manner it curves toward the holder 52. As the presser 64 presses against the reflecting mirror 46 slightly in the direction B', an amount of curve, that is, a curvature, of the reflecting mirror 46 is decreased as shown in FIG. 22. As the presser 64 presses against the reflecting mirror 46 further in the direction B', the reflecting mirror 46 is bent like a bow in a direction shown in FIG. 23 opposite the direction in which it is initially bent before the presser 64 presses against the reflecting mirror 46 as shown in FIG. 21. That is, the reflecting mirror 46 is curved into an inverted curve from the curve R shown in FIG. 21.

Figure 24:
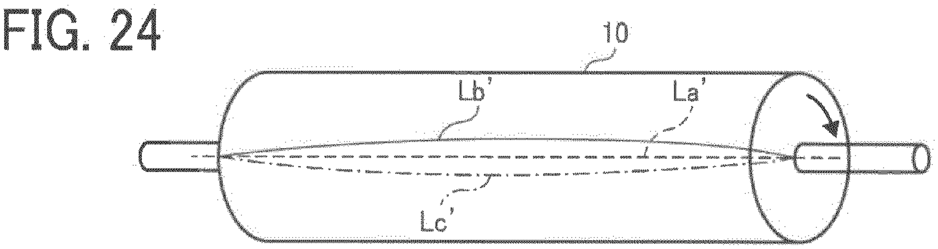
FIG. 24 is a perspective view of a photoconductor showing a light beam deflected by the reflecting mirror shown in FIG. 21 and scanning a surface of the photoconductor in a main scanning direction.

FIG. 24 is a perspective view of a photoconductor 10 that receives a light beam deflected by the reflecting mirror 46 to form an electrostatic latent image thereon. With the configuration of the comparative curve correction mechanism 50C1 shown in FIGS. 19 to 23, the reflecting mirror 46 is curved either toward or away from the holder 52, thus correcting the scan direction of the light beam scanning the photoconductor 10 in the main scanning direction from a curve Lb' indicated by the solid line and a curve Lc' indicated by the alternate long and short dashed line to a desired line La' indicated by the broken line.

Figure 25:
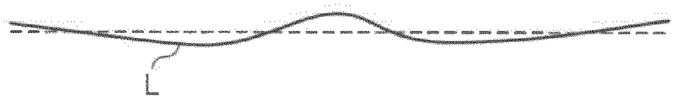
FIG. 25 is a horizontal sectional view of a W-shaped light beam scanning the surface of the photoconductor shown in FIG. 24.
Figure 26:
FIG. 26 is a horizontal sectional view of an M-shaped light beam scanning the surface of the photoconductor shown in FIG. 24.

With the configuration of the comparative curve correction mechanism 50C1 shown in FIG. 19, as the presser 64 presses against the center portion of the reflecting mirror 46 in the longitudinal direction thereof in the direction B' which is forcibly bent in the direction A' by the plate springs 54 and the protrusions 52*a*, the curve of the reflecting mirror 46 is corrected over the main scanning direction. Specifically, the mirror face 46*m* of the reflecting mirror 46 is bent downward in FIG. 19 by pressure from the presser 64 in such a manner that the mirror face 46*m* of the center portion of the reflecting mirror 46 in the longitudinal direction thereof is below the protrusions 52*a*. By contrast, pressure from the plate springs 54 prohibits lateral ends of the reflecting mirror 46 in the longitudinal direction thereof from being bent below the protrusions 52*a*. Thus, each of the lateral ends of the reflecting mirror 46 is bent about a point thereon that receives pressure from the plate spring 54 toward the holder 52. Accordingly, the reflecting mirror 46 may be waved after the comparative curve correction mechanism 50C1 performs correction of curve of the reflecting mirror 46. Consequently, when a light beam L reflected by the reflecting mirror 46 forcibly curved by the comparative curve correction mechanism 50C1 illuminates the photoconductor 10 depicted in FIG. 24 directly, the light beam L, after correction of the comparative curve correction mechanism 50C1, may scan the photoconductor 10 in a W-shaped main scanning direction as shown in FIG. 25. Alternatively, when a light beam L reflected by the reflecting mirror 46 forcibly curved by the comparative curve correction mechanism 50C1 is reflected and reversed by another reflecting mirror, the light beam L may scan the photoconductor 10 in an M-shaped main scanning direction as shown in FIG. 26, resulting in faulty curve correction of the reflecting mirror 46.

Figure 27A:
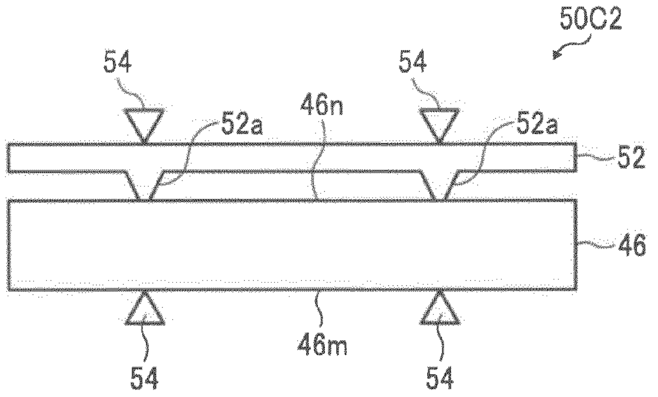
FIG. 27A is a horizontal sectional view of another comparative curve correction mechanism.
Figure 27B:
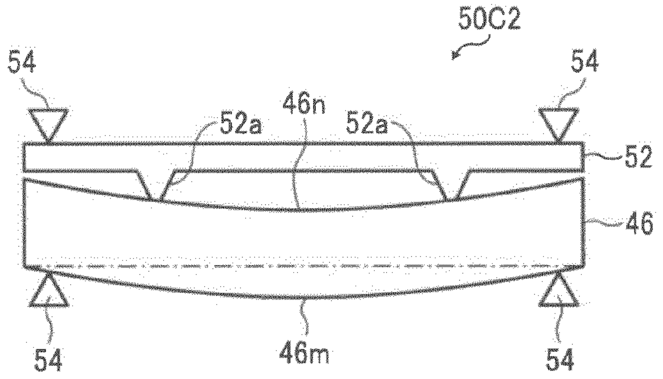
FIG. 27B is a horizontal sectional view of the comparative curve correction mechanism shown in FIG. 27A in a state in which plate springs included therein press against lateral ends of a holder in a longitudinal direction thereof.
Figure 27C:
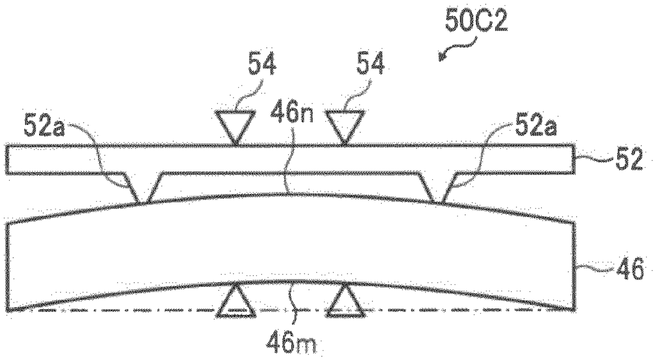
FIG. 27C is a horizontal sectional view of the comparative curve correction mechanism shown in FIG. 27A in a state in which the plate springs press against a center portion of the holder in the longitudinal direction thereof.

Referring to FIGS. 27A to 27C, a detailed description is now given of another comparative curve correction mechanism 50C2.

FIGS. 27A to 27C illustrate a horizontal sectional view of the comparative curve correction mechanism 50C2 in which the plate springs 54 slide in the longitudinal direction of the reflecting mirror 46 to correct curve of the reflecting mirror 46.

As illustrated in FIG. 27A, the comparative curve correction mechanism 50C2 includes the plate springs 54 supported by the holder 52 slidably in the longitudinal direction of the holder 52. As the plate springs 54 slide over the holder 52 to the positions outboard from the protrusions 52*a*, respectively, in the longitudinal direction of the holder 52 as shown in FIG. 27B, the center portion of the reflecting mirror 46 in the longitudinal direction thereof is forcibly curved away from the holder 52. By contrast, as the plate springs 54 slide over the holder 52 to the positions inboard from the protrusions 52*a*, respectively, in the longitudinal direction of the holder 52 as shown in FIG. 27C, the center portion of the reflecting mirror 46 in the longitudinal direction thereof is forcibly curved toward the holder 52. Thus, this configuration of the comparative curve correction mechanism 50C2 in which the plate springs 54 slide over the holder 52 in the longitudinal direction of the holder 52 can correct curve, that is, the curves Lb' and Lc' depicted in FIG. 24, of the light beam scanning the photoconductor 10 in the main scanning direction.

Further, the comparative curve correction mechanism 50C2 forcibly curves the center portion of the reflecting mirror 46 in the longitudinal direction thereof toward and away from the holder 52 by using pressure from the plate springs 54, thus preventing the light beam from scanning the photoconductor 10 in the W-shaped main scanning direction shown in FIG. 25 and in the M-shaped main scanning direction shown in FIG. 26.

However, the comparative curve correction mechanism 50C2 has a drawback in that the plate springs 54 also slide over the mirror face 46*m* of the reflecting mirror 46, that is, a vapor-deposited film treated with aluminum-vapor-deposition on a resin plate, thus peeling the vapor-deposited film off the reflecting mirror 46. Although the plate springs 54 do not slide over an illumination section on the mirror face 46*m* of the reflecting mirror 46 illuminated by a light beam, once the vapor-deposited film is peeled off the reflecting mirror 46, cracks may propagate in the vapor-deposited film from the peeled off section to the illumination section on the mirror face 46*m* of the reflecting mirror 46 that reflects the incident light beam.

Compared to the comparative curve correction mechanisms 50C1 and 50C2 described above, the curve correction mechanisms 50Y, 50YS, 50YT, and 50YU depicted in FIGS. 10A, 15A, 17, and 18A, respectively, can provide advantages described below.

For example, the curve correction mechanisms 50Y, 50YS, 50YT, and 50YU include the support (e.g., the hook 52*a*Y) that contacts the first end, that is, the vicinity of the lateral end, of the reflecting mirror (e.g., the second reflecting mirror 45Y) in the longitudinal direction thereof to support the reflecting mirror and the pressing member (e.g., the plate spring 54Y, 541Y, 542Y, or 54YS or the pressing lever 101Y) that presses against the reflecting mirror. The pressing member includes the first pressing portion (e.g., the first face 54*a*Y, 541*a*Y, 542*a*Y, or 54*a*YS or the first pressing portion 101*a*Y) that contacts and presses against the outboard portion (e.g., the outboard portion 45Ye) of the reflecting mirror provided outboard from the support in the longitudinal direction of the reflecting mirror; and the second pressing portion (e.g., the junction A or the second pressing portion 101*b*Y) that contacts and presses against the inboard portion (e.g., the inboard portion 45Yc) of the reflecting mirror provided inboard from the support in the longitudinal direction of the reflecting mirror. The pressing member is rotated or swung by the adjuster (e.g., the adjusting screw 55Y or the actuator 103Y) to isolate one of the first pressing portion and the second pressing portion from the reflecting mirror as another one of them contacts the reflecting mirror. For example, the adjuster contacts and moves the pressing member between the first position, where the first pressing portion of the pressing member presses against the outboard portion of the reflecting mirror while the second pressing portion of the pressing member is isolated from the reflecting mirror, and the second position, where the second pressing portion of the pressing member presses against the inboard portion of the reflecting mirror while the first pressing portion of the pressing member is isolated from the reflecting mirror.

With this configuration, the pressing member, as it rotates or swings, switches the pressure application position where the pressing member presses against the reflecting mirror between the inboard position on the inboard portion of the reflecting mirror and the outboard position on the outboard portion of the reflecting mirror.

When the first pressing portion presses against the reflecting mirror, the second pressing portion is isolated from the reflecting mirror; by contrast, when the second pressing portion presses against the reflecting mirror, the first pressing portion is isolated from the reflecting mirror, thus switching the direction in which the reflecting mirror is curved forcibly.

Accordingly, unlike the comparative curve correction mechanism 50C2 described above in which the plate springs 54 pressing against the reflecting mirror 46 slide in the longitudinal direction of the reflecting mirror to switch the pressure application position where the plate springs 54 press against the reflecting mirror, thus changing the direction in which the reflecting mirror is curved forcibly, the pressing member according to the above-described exemplary embodiments does not slide over the mirror face of the reflecting mirror, minimizing damage to the reflecting mirror and preventing the vapor-deposited film from peeling off the reflecting mirror.

Further, the pressure application position where the pressing member presses against the reflecting mirror can be switched between the outboard portion outboard from the support and the inboard portion inboard from the support in the longitudinal direction of the reflecting mirror. Thus, the center portion of the reflecting mirror in the longitudinal direction thereof can be curved bidirectionally toward and away from the holder (e.g., the holder 52 or 52YS), correcting the optical path of the light beam scanning the photoconductor (e.g., the photoconductors 10Y, 100, 10M, and 10K depicted in FIG. 3) in the main scanning direction from the curves Lb' and Lc' to the desired line La' as shown in FIG. 24.

Specifically, when the first pressing portion presses against the outboard portion of the reflecting mirror, the center portion of the reflecting mirror is curved forcibly toward the holder disposed opposite the support via the reflecting mirror. As the adjuster moves the first pressing portion in the direction to separate the first pressing portion from the reflecting mirror, the first pressing portion presses against the reflecting mirror with a decreased pressure, thus decreasing the curvature of the reflecting mirror. As the adjuster moves the first pressing portion further, the first pressing portion is isolated from the reflecting mirror while the second pressing portion contacts and presses against the inboard portion of the reflecting mirror, thus forcibly curving the center portion of the reflecting mirror away from the holder toward the support. That is, the reflecting mirror is curved bidirectionally toward and away from the holder to correct the direction and degree of curvature of a light beam reflected by the reflecting mirror and scanning the photoconductor in the main scanning direction.

Further, when the first pressing portion presses against the reflecting mirror, the second pressing portion is isolated from the reflecting mirror; by contrast, when the second pressing portion presses against the reflecting mirror, the first pressing portion is isolated from the reflecting mirror, thus switching the direction in which the reflecting mirror is curved. Accordingly, unlike the configuration of the comparative curve correction mechanism 50C1 shown in FIG. 19 in which the presser 64 presses against the reflecting mirror 46 in the direction B' in which the reflecting mirror 46 is bent away from the holder 52 while the plate springs 54 press against the reflecting mirror 46 in the direction A' counter to the direction B', in which the reflecting mirror 46 is bent toward the holder 52, the reflecting mirror according to the above-described exemplary embodiments is not applied with pressure in the opposite directions from the first pressing portion and the second pressing portion simultaneously. Consequently, after the curve correction, the optical path of the light beam scanning the photoconductor in the main scanning direction is neither W-shaped nor M-shaped as shown in FIGS. 25 and 26, preventing color registration error among electrostatic latent images for the yellow, cyan, magenta, and black colors formed on the respective photoconductors.

The curve correction mechanisms 50Y, 50YS, 50YT, and 50YU further include the holder (e.g., the holder 52Y or 52YS), made of a material having a rigidity greater than that of the reflecting mirror, which has an opposed face disposed opposite the back face 45Yn disposed back-to-back to the mirror face 45Ym of the reflecting mirror, thus curvably holding the reflecting mirror. With this configuration, the holder can minimize its deformation over time compared to a configuration in which the holder has a rigidity equivalent to or smaller than that of the reflecting mirror, thus correcting the direction and degree of curvature of the reflecting mirror in the main scanning direction for an extended period of time.

As illustrated in FIGS. 12A to 12C, the pressing member includes the first face (e.g., the first face 54*a*Y, 541*a*Y, 542*a*Y, or 54*a*YS) and the second face (e.g., the second face 54*b*Y, 542*b*Y, or 54*b*YS) that are coupled into the plate spring (e.g., the plate spring 54Y, 541Y, 542Y, or 54YS) having an acute angle. Specifically, the plate spring disposed between the reflecting mirror and the holder includes the first face constituting the first pressing portion to contact the reflecting mirror; the second face continuous with the first face and disposed at an acute angle with respect to the first face to contact the holder; and the junction constituting the second pressing portion and coupling the first face with the second face.

The second face of the plate spring contacts the opposed face of the holder; the first face of the plate spring contacts the lateral end of the reflecting mirror in the longitudinal direction thereof. As the adjuster rotates the plate spring to the second position and therefore the first face of the plate spring is isolated from the reflecting mirror, the junction connecting the first face with the second face of the plate spring contacts the inboard portion of the reflecting mirror inboard from the support (e.g., the hook 52*a*Y) in the longitudinal direction of the reflecting mirror. That is, the first face of the plate spring serves as the first pressing portion that presses against the outboard portion of the reflecting mirror; the junction serves as the second pressing portion that presses against the inboard portion of the reflecting mirror. Further, since the plate spring serves as the pressing member, the first face of the plate spring can press against the reflecting mirror initially, thus no separate pressing member is necessary.

For example, as illustrated in FIG. 12A, the first end of the reflecting mirror in the longitudinal direction thereof contacts the inboard section S2 of the first face of the plate spring provided near the junction and inboard from the end section S1 of the first face toward the junction, while the length of the second face of the plate spring in the longitudinal direction of the reflecting mirror is smaller than that of the first face of the plate spring. Thus, as the adjuster (e.g., the adjusting screw 55Y) presses against the end section S1 of the first face of the plate spring toward the holder, the plate spring rotates, causing the junction to contact the reflecting mirror as shown in FIG. 12C.

The adjusting screw (e.g., the adjusting screw 55Y) insertable in the first through-hole (e.g., the through-hole 54*c*Y depicted in FIG. 12A) provided in the end section S1 of the first face of the plate spring is threaded through the second threaded through-hole (e.g., the threaded through-hole 52*b*Y depicted in FIG. 12A) provided in the holder, thus pressing against the first face of the plate spring. Accordingly, the simple operation of screwing the adjusting screw can press and rotate the plate spring, switching the pressure application position where the plate spring presses against the reflecting mirror, increasing and decreasing pressure with which the plate spring presses against the reflecting mirror, and adjusting the direction and degree of curvature of the reflecting mirror.

Alternatively, as illustrated in FIG. 15A, the adjusting screw may be inserted in the third through-hole (e.g., the through-hole 52*c*Y depicted in FIG. 15A) provided in the holder and may be threaded through the fourth threaded through-hole (e.g., the threaded through-hole 59*a*Y depicted in FIG. 16) provided in the end section S1 of the first face of the plate spring, thus pressing against the first face of the plate spring. This alternative configuration can also provide the above-described advantages of adjusting the direction and degree of curvature of the reflecting mirror. Additionally, the service engineer can touch and screw the adjusting screw from the holder.

Further, as illustrated in FIGS. 13A and 13B, the first face (e.g., the first face 541*a*Y) of the plate spring (e.g., the plate spring 541Y) curving toward the reflecting mirror, as it rotates, contacts the reflecting mirror at the position thereon changing continuously. Thus, even when the first face of the plate spring presses against the reflecting mirror with a substantially constant pressure, the first face of the plate spring sliding over the reflecting mirror can adjust the direction and degree of curvature of the reflecting mirror.

Further, as illustrated in FIGS. 14A and 14B, the second face (e.g., the second face 542*b*Y) of the plate spring (e.g., the plate spring 542Y) curving toward the holder is deformed by a repulsive force from the holder easily. Accordingly, when the first face (e.g., the first face 542*a*Y) of the plate spring is pressed toward the holder in a state in which the junction of the plate spring contacts the reflecting mirror, the second face of the plate spring is elastically deformed by a reactive force from the holder. Accordingly, a return force of the elastically deformed second face of the plate spring added to a rotation force of the entire plate spring increases pressure with which the junction of the plate spring presses against the reflecting mirror, thus attaining the curvature of the reflecting mirror that curves toward the holder great enough to provide a substantial range of adjustment of curving of the reflecting mirror.

Further, as illustrated in FIG. 17, the support (e.g., the hook 52*a*Y), the pressing member (e.g., the plate spring 54Y), and the adjuster (e.g., the adjusting screw 55Y depicted in FIG. 12C) are disposed at both lateral ends of the reflecting mirror in the longitudinal direction thereof to curve the reflecting mirror into an arc shape in which the center of the reflecting mirror in the longitudinal direction thereof is the arc crest. Consequently, the arcuate reflecting mirror can improve accuracy of incident light beams illuminating the photoconductors 10Y, 100, 10M, and 10K depicted in FIG. 1 to form electrostatic latent images thereon, thus enhancing accuracy of transferring and superimposing toner images visualized from the electrostatic latent images from the photoconductors 10Y, 10C, 10M, and 10K onto the intermediate transfer belt 20 depicted in FIG. 1.

The above-described curve correction mechanisms are installed in the optical scanner (e.g., the optical writing unit 4 depicted in FIG. 3) to correct the direction and degree of curvature of a light beam scanning the photoconductors 10Y, 10C, 10M, and 10K in the main scanning direction.

The optical scanner is installed in the image forming apparatus 100 depicted in FIG. 1 to prevent color registration error among electrostatic latent images for the yellow, cyan, magenta, and black colors formed on the photoconductors 10Y, 10C, 10M, and 10K, resulting in formation of a high-quality image on a recording medium.

The present invention has been described above with reference to specific exemplary embodiments. Note that the present invention is not limited to the details of the embodiments described above, but various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. A curve correction mechanism for correcting a direction and degree of curvature of a reflecting mirror that reflects a light beam, the curve correction mechanism comprising:

a support contacting a first end of the reflecting mirror in a longitudinal direction thereof to support the reflecting mirror;

a pressing member to press against the reflecting mirror, the pressing member including:

a first pressing portion to press against an outboard portion of the reflecting mirror provided outboard from the support in the longitudinal direction of the reflecting mirror; and a second pressing portion to press against an inboard portion of the reflecting mirror provided inboard from the support in the longitudinal direction of the reflecting mirror; and an adjuster to contact and move the pressing member between a first position, where the first pressing portion of the pressing member presses against the outboard portion of the reflecting mirror while the second pressing portion of the pressing member is isolated from the reflecting mirror, and a second position, where the second pressing portion of the pressing member presses against the inboard portion of the reflecting mirror while the first pressing portion of the pressing member is isolated from the reflecting mirror, wherein when pressure exerted by the first pressing portion against the outboard portion of the reflecting mirror increases, pressure by the second pressing portion against the inboard portion decreases, and when pressure exerted by the second pressing portion against the inboard portion of the reflecting mirror increases, pressure by the first pressing portion against the outboard portion decreases.

2. The curve correction mechanism according to claim 1, wherein the adjuster rotates the pressing member in a first direction to the first position and in a second direction counter to the first direction to the second position.

3. The curve correction mechanism according to claim 2, further comprising a holder having a rigidity greater than a rigidity of the reflecting mirror to curvably hold the reflecting mirror, wherein the pressing member includes a plate spring disposed between the reflecting mirror and the holder, the plate spring including:

a first face constituting the first pressing portion to contact the reflecting mirror;

a second face continuous with the first face and disposed at an acute angle with respect to the first face to contact the holder; and a junction constituting the second pressing portion and coupling the first face with the second face, wherein when the adjuster rotates the plate spring to the second position, the first face of the plate spring is isolated from the reflecting mirror while the junction of the plate spring contacts the inboard portion of the reflecting mirror.

4. The curve correction mechanism according to claim 3, wherein the adjuster presses against an end section of the first face of the plate spring in the longitudinal direction of the reflecting mirror to move the plate spring toward the holder, and the first end of the reflecting mirror in the longitudinal direction thereof contacts an inboard section of the first face of the plate spring provided inboard from the end section thereof toward the junction, and wherein a length of the second face of the plate spring is smaller than a length of the first face of the plate spring.

5. The curve correction mechanism according to claim 4, wherein the plate spring includes a first through-hole provided in the end section of the first face of the plate spring, the holder includes a second threaded through-hole, and the adjuster includes an adjusting screw insertable in the first through-hole and threaded through the second threaded through-hole.

6. The curve correction mechanism according to claim 5, wherein the holder includes a third through-hole, the plate spring includes a fourth threaded through-hole provided in the end section of the first face of the plate spring, and the adjuster includes an adjusting screw insertable in the third through-hole and threaded through the fourth threaded through-hole.

7. The curve correction mechanism according to claim 3, wherein the first face of the plate spring is curved toward the reflecting mirror.

8. The curve correction mechanism according to claim 3, wherein the second face of the plate spring is curved toward the holder.

9. The curve correction mechanism according to claim 1, further comprising:

a secondary support contacting a second end of the reflecting mirror opposite the first end of the reflecting mirror in the longitudinal direction thereof to support the reflecting mirror;

a secondary pressing member to press against the reflecting mirror, the secondary pressing member including:

a secondary first pressing portion to press against an outboard portion of the reflecting mirror provided outboard from the secondary support in the longitudinal direction of the reflecting mirror; and a secondary second pressing portion to press against an inboard portion of the reflecting mirror provided inboard from the secondary support in the longitudinal direction of the reflecting mirror; and a secondary adjuster to contact and move the secondary pressing member between a first position, where the secondary first pressing portion of the secondary pressing member presses against the outboard portion of the reflecting mirror while the secondary second pressing portion of the secondary pressing member is isolated from the reflecting mirror, and a second position, where the secondary second pressing portion of the secondary pressing member presses against the inboard portion of the reflecting mirror while the secondary first pressing portion of the secondary pressing member is isolated from the reflecting mirror.

10. The curve correction mechanism according to claim 1, wherein the pressing member includes a pressing lever and the adjuster includes an actuator.

11. An optical scanner comprising:

a light beam emitter to emit a light beam;

a deflector to deflect the light beam emitted by the light beam emitter in a main scanning direction;

a reflecting mirror to reflect the light beam deflected by the deflector;

a light beam receptor scanned by the light beam reflected by the reflecting mirror in the main scanning direction; and the curve correction mechanism according to claim 1, wherein the curve correction mechanism is attached to the reflecting mirror to correct a direction and degree of curvature of the reflecting mirror.

12. An image forming apparatus comprising the optical scanner according to claim 11.

* * * * *